US011501643B2

(12) United States Patent
Goldman et al.

(10) Patent No.: US 11,501,643 B2
(45) Date of Patent: Nov. 15, 2022

(54) REDUCING AUTONOMOUS VEHICLE DOWNTIME AND IDLE DATA USAGE

(71) Applicant: Uber Technologies, Inc., San Francisco, CA (US)

(72) Inventors: Brent Justin Goldman, San Fransico, CA (US); Leigh Gray Hagestad, San Francisco, CA (US); Rei Chiang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 267 days.

(21) Appl. No.: 16/401,629

(22) Filed: May 2, 2019

(65) Prior Publication Data

US 2019/0340928 A1    Nov. 7, 2019

Related U.S. Application Data

(60) Provisional application No. 62/665,868, filed on May 2, 2018.

(51) Int. Cl.
  *G08G 1/00* (2006.01)
  *G08G 1/01* (2006.01)
  (Continued)

(52) U.S. Cl.
  CPC .............. *G08G 1/202* (2013.01); *G06Q 10/02* (2013.01); *G06Q 50/30* (2013.01); *G08G 1/0125* (2013.01); *G08G 1/065* (2013.01); *G08G 1/091* (2013.01)

(58) Field of Classification Search
  CPC ...... G08G 1/202; G08G 1/065; G08G 1/0125; G08G 1/091; G08G 1/201; G06Q 10/02;
  (Continued)

(56) References Cited

U.S. PATENT DOCUMENTS 9,606,539 B1    3/2017  Kentley et al.
9,632,502 B1    4/2017  Levinson et al.
(Continued)

FOREIGN PATENT DOCUMENTS

EP              3788568 A1     3/2021
WO    WO-2019213415 A1    11/2019

OTHER PUBLICATIONS

International Search Report and Written Opinion for PCT/US2019/030430, dated Jun. 14, 2019, 10 pages.
(Continued)

*Primary Examiner* — Russell Frejd
*Assistant Examiner* — Ellis B. Ramirez
(74) *Attorney, Agent, or Firm* — Schwegman Lundberg & Woessner, P.A.

(57) ABSTRACT

Systems and methods for controlling an autonomous vehicle to reduce idle data usage and vehicle downtime are provided. In one example embodiment, a computing system can obtain data associated with autonomous vehicle(s) that are online with a service entity. The computing system can obtain data indicative of the geographic area with an imbalance in a number of vehicles associated with the geographic area. The computing system can determine a first autonomous vehicle for re-positioning with respect to the geographic area based at least in part on the data associated with the one or more autonomous vehicles and the data indicative of the geographic. The computing system can communicating data indicative of a first re-positioning assignment associated with the first autonomous vehicle. In some implementations, the computing system can generate vehicle service incentive to entice a vehicle provider to re-position its autonomous vehicles with respect to the geographic area.

20 Claims, 8 Drawing Sheets

(51) Int. Cl.
*G08G 1/09* (2006.01)
*G06Q 10/02* (2012.01)
*G06Q 50/30* (2012.01)
*G08G 1/065* (2006.01)

(58) Field of Classification Search
CPC ............ G06Q 50/30; G06Q 10/06313; G06Q 10/06315; G06Q 10/063; G06Q 10/20; G06Q 30/0207; G06Q 30/0239; G07C 5/0808; G07C 5/006; G07B 15/02; G06N 5/04; G05D 1/0291; G05D 1/0088; G01C 21/34; H04W 4/029; H04W 4/40; H04W 4/42; H04W 4/44
USPC ........... 701/23, 117; 705/5, 7.12, 7.13, 7.16, 705/7.21, 7.22, 26.3; 340/989
See application file for complete search history.

(56) References Cited

U.S. PATENT DOCUMENTS

| | | |
|---|---|---|
| 9,811,086 B1 | 11/2017 | Poeppel et al. |
| 10,248,913 B1 | 4/2019 | Gururajan et al. |
| 2016/0209220 A1 | 7/2016 | Laetz |
| 2016/0247109 A1 | 8/2016 | Scicluna et al. |
| 2016/0247247 A1* | 8/2016 | Scicluna ................ G06Q 50/30 |
| 2016/0342915 A1 | 11/2016 | Humphrey |
| 2017/0091891 A1* | 3/2017 | Van Der Berg ....... G07B 13/00 |
| 2017/0169366 A1 | 6/2017 | Klein et al. |
| 2017/0192437 A1 | 7/2017 | Bier et al. |
| 2017/0193826 A1 | 7/2017 | Marueli et al. |
| 2017/0262790 A1 | 9/2017 | Khasis |
| 2017/0323244 A1 | 11/2017 | Rani et al. |
| 2017/0352125 A1* | 12/2017 | Dicker ............... G06Q 10/1097 |
| 2018/0136651 A1 | 5/2018 | Levinson et al. |
| 2018/0211541 A1* | 7/2018 | Rakah ............. B60W 60/00253 |
| 2018/0224866 A1 | 8/2018 | Alonso-mora et al. |
| 2019/0196503 A1 | 6/2019 | Abari et al. |
| 2019/0197798 A1 | 6/2019 | Abari et al. |
| 2019/0340927 A1 | 11/2019 | Goldman et al. |
| 2020/0160718 A1* | 5/2020 | Saleh ..................... G08G 1/202 |

OTHER PUBLICATIONS

"U.S. Appl. No. 16/401,615, Examiner Interview Summary dated Oct. 26, 2021", 3 pgs.

"U.S. Appl. No. 16/401,615, Non Final Office Action dated Jul. 23, 2021", 24 pgs.

"U.S. Appl. No. 16/401,615, Notice of Allowance dated Feb. 22, 2022", 8 pgs.

"U.S. Appl. No. 16/401,615, Notice of Allowance dated May 19, 2022", 8 pgs.

"U.S. Appl. No. 16/401,615, Response filed Oct. 25, 2021 to Non Final Office Action dated Jul. 23, 2021", 17 pgs.

"European Application Serial No. 19724986.5, Communication Pursuant to Article 94(3) EPC dated Apr. 13, 2022", 7 pgs.

"European Application Serial No. 19724986.5, Response to Communication pursuant to Rules 161(1) and 162 EPC filed Jun. 15, 2021", 17 pgs.

"International Application Serial No. PCT/US2019/030430, International Preliminary Report on Patentability dated Nov. 12, 2020", 7 pgs.

* cited by examiner

REDUCING AUTONOMOUS VEHICLE DOWNTIME AND IDLE DATA USAGE

RELATED APPLICATIONS

The present application is based on and claims priority to U.S. Provisional Application 62/665,868 having a filing date of May 2, 2018, which is incorporated by reference herein.

FIELD

The present disclosure relates generally to controlling autonomous vehicles to reduce vehicle downtime and for efficient use of the computational resources of the autonomous vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for controlling autonomous vehicles. The method includes obtaining, by a computing system that includes one or more computing devices, data associated with one or more autonomous vehicles that are online with a service entity. The method includes obtaining, by the computing system, data indicative of a geographic area with an imbalance in a number of vehicles associated with the geographic area. The method includes determining, by the computing system, a first autonomous vehicle for re-positioning with respect to the geographic area based at least in part on the data associated with the one or more autonomous vehicles and the data indicative of the geographic. The method includes communicating, by the computing system, data indicative of a first re-positioning assignment associated with the first autonomous vehicle, wherein the first re-positioning assignment is indicative of the re-positioning of the first autonomous vehicle with respect to the geographic area.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data associated with an autonomous vehicle that is online with a service entity and is in an idle state. The operations include obtaining data indicative of a geographic area with an imbalance in a number of vehicles associated with the geographic area, wherein the imbalance includes a surplus or a deficit in the number of vehicles. The operations include determining the autonomous vehicle for re-positioning to the geographic area based at least in part on the data associated with the autonomous vehicle and the data indicative of the geographic area. The operations include communicating data indicative of a re-positioning assignment associated with the autonomous vehicle, wherein the re-positioning assignment is indicative of the geographic area.

Yet another example aspect of the present disclosure is directed to one or more tangible, non-transitory, computer-readable media that collectively store instructions that, when executed by one or more processors, cause the one or more processors to perform operations. The operations include obtaining data indicative of a geographic area with an imbalance in a number of vehicles associated with the geographic area. The operations include determining one or more autonomous vehicles for re-positioning with respect to the geographic area, wherein the one or more autonomous vehicles are online with a service entity and are in an idle state, and wherein the service entity is associated with the provision of one or more vehicle services within the geographic area. The operations include communicating data indicative of one or more re-positioning assignments associated with the one or more autonomous vehicles, wherein the one or more re-positioning assignments are indicative of the geographic area.

One example aspect of the present disclosure is directed to a computer-implemented method for controlling autonomous vehicles. The method includes obtaining, by a first computing system including one or more computing devices, data associated with a geographic area. The method includes determining, by first the computing system, that the geographic area has a vehicle imbalance based at least in part on the data associated with the geographic area. The method includes generating, by the first computing system, data indicative of a vehicle service incentive associated with the geographic area that has the vehicle imbalance. The method includes communicating, by the first computing system, the data indicative of the vehicle service incentive to a second computing system associated with a vehicle provider, wherein the vehicle provider is associated with one or more autonomous vehicles.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of a geographic area with a vehicle imbalance. The operations include generating data indicative of a vehicle service incentive associated with the geographic area that has the vehicle imbalance. The operations include communicating the data indicative of the vehicle service incentive to a plurality of other computing systems of a plurality of vehicle providers, each different computing system being associated with a different vehicle provider, and each different vehicle provider being associated with one or more different autonomous vehicles.

Yet another example aspect of the present disclosure is directed to one or more tangible, non-transitory, computer-readable media that collectively store instructions that, when executed by one or more processors, cause the one or more processors to perform operations. The operations include obtaining data indicative of a geographic area with a vehicle imbalance. The operations include generating data indicative of a vehicle service incentive associated with the geographic area that has the vehicle imbalance. The operations include communicating, to a plurality of computing systems, the data indicative of the vehicle service incentive associated with the geographic area, wherein each computing system of the plurality of computing systems is associated with a different vehicle provider. The operations include confirming that a first autonomous vehicle associated with a first vehicle provider is being or has been re-positioned with respect to the geographic area. The operations include communicating data indicative of a first vehicle service assignment to the first autonomous vehicle, wherein the first vehicle service assignment is based at least in part on the vehicle service incentive, and wherein the first vehicle service assignment is indicative of a first requested vehicle service.

Other example aspects of the present disclosure are directed to systems, methods, vehicles, apparatuses, tangible, non-transitory computer-readable media, and memory devices for controlling autonomous vehicles, reducing the vehicle downtime, efficiently using of the computational resources of the autonomous vehicles.

The technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
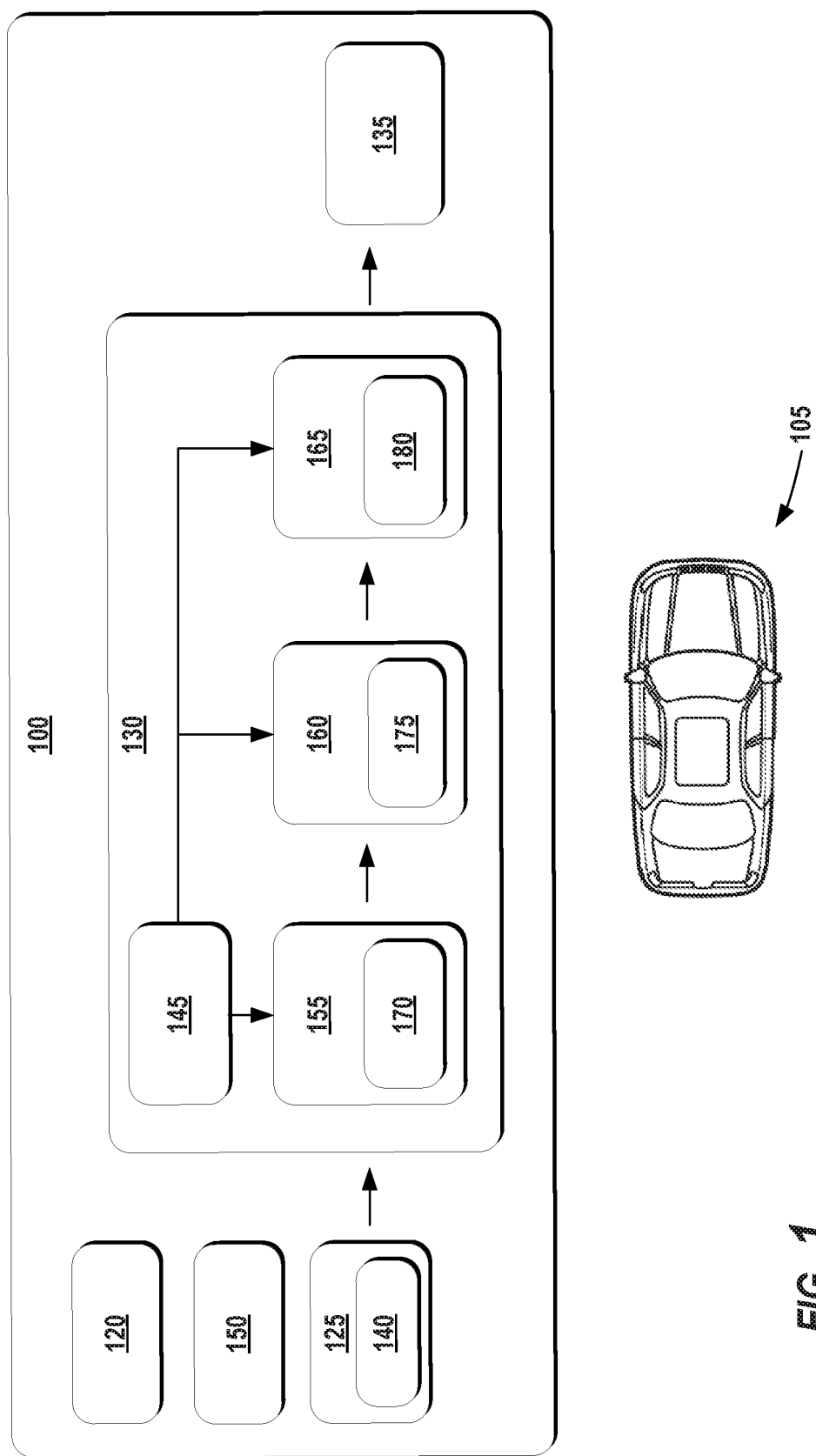
FIG. 1 depicts an example autonomous vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved techniques for decreasing the idle data usage and downtime of an autonomous vehicle. For instance, an autonomous vehicle can be utilized to perform vehicle services (e.g., transportation services, etc.). The vehicle services can be offered to users by a service entity (e.g., a company that offers and coordinates the provision of vehicle services). In the event that a user requests a vehicle service, a computing system of the service entity can send a vehicle service assignment (e.g., a trip request) to an autonomous vehicle that is online with the service entity. When it is not addressing a vehicle service assignment, an autonomous vehicle can be in an idle state. However, even in the idle state, an autonomous vehicle can continue to acquire sensor data to remain cognizant of its environment (e.g., whether the vehicle is parked, moving, etc.). This can cause the autonomous vehicle to waste its processing, data storage, and power resources while it is not performing a vehicle service and, ultimately, increase vehicle downtime (e.g., as the vehicle is forced to travel to a service depot for data downlinking, re-charging, etc.)

The systems and methods of the present disclosure can help strategically position autonomous vehicles to reduce such computational waste. For instance, a computing system (e.g., of a service entity) can identify autonomous vehicle(s) that are in an idle state. The computing system can also identify a geographic area with an imbalance in a number of vehicles associated with the geographic area. The imbalance can be a surplus or a deficit in the number of vehicles (e.g., available to perform vehicle services) as compared to a demand for the vehicle service(s). The computing system can determine which of the idle autonomous vehicle(s) are available to be re-positioned with respect to the geographic area (e.g., to increase the number of vehicles in that area in the event of a deficit). The computing system can instruct these autonomous vehicles to autonomously travel to the geographic area, where the vehicles can obtain vehicle service assignments. Moreover, in some implementations, a service entity can entice a third party vehicle provider (e.g., vehicle vendor, etc.) to re-position its fleet of autonomous vehicles to the imbalanced geographic area, as further described herein. In this way, autonomous vehicles can be re-positioned so that they are more likely to receive vehicle service assignments, thereby reducing the amount of inefficient idle data usage and vehicle downtime.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

A user can provide (e.g., via a user device) a request for a vehicle service to an operations computing system associated with the service entity. The request can indicate the type of vehicle service that the user desires (e.g., a user transportation service, a delivery service, a courier service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information.

The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system so that the vehicle computing system can communicate with the operations computing system via a network of the service entity. For example, the vehicle computing system can launch an onboard vehicle client (e.g., software, firmware, etc.) associated with the service entity and open a communication session with the service entity's operations computing system. The vehicle computing system can communicate that vehicle is available to perform a vehicle service for the service entity via the communication session (e.g., using an API associated with the service entity). Once online, the operations computing system can communicate a vehicle service assignment indicative of the requested vehicle services and/or other data to the autonomous vehicle.

A service entity may have varying levels of control over the autonomous vehicles that perform its vehicle services. In some implementations, an autonomous vehicle can be included in the service entity's dedicated supply of autonomous vehicles. The dedicated supply can include autonomous vehicles that are owned, leased, or otherwise exclusively available to the service entity (e.g., for the provision of its vehicle service(s), other tasks, etc.) for at least some period of time. This can include, for example, an autonomous vehicle that is associated with a vehicle provider (e.g., an owner, a manufacturer, a vendor, a manager, a coordinator, a handler, etc.), but that is online only with that service entity (e.g., available to accept vehicle service assignments for only that service entity) for a certain time period (e.g., a day, week, etc.). In some implementations, an autonomous vehicle can be included in the service entity's non-dedicated supply of autonomous vehicles. This can include autonomous vehicles that are not exclusively available to the service entity. For example, an autonomous vehicle that is concurrently online with two different service entities so that the autonomous vehicle may accept vehicle service assignments from either service entity may be considered to be part of a non-dedicated supply of autonomous vehicles. In some implementations, whether an autonomous vehicle is considered to be part of the dedicated supply or the non-dedicated supply can be based, for example, on an agreement between the service entity and a vehicle provider associated with the autonomous vehicle.

Regardless of whether an autonomous vehicle is part of the dedicated or non-dedicated supply, the service entity can seek to decrease the amount of time that the autonomous vehicle is idle (e.g., not addressing a vehicle service assignment, performing a vehicle service, etc.). To do so, the operations computing system can obtain data associated with one or more autonomous vehicles that are online with the service entity. These can be autonomous vehicle(s) that are a part of the service entity's dedicated supply or non-dedicated supply. Moreover, these can be autonomous vehicle(s) that are included in the vehicle fleet of a vehicle provider and are online with the service entity. The data associated with these one or more autonomous vehicles can be indicative of a vehicle's: online/offline status, the vehicle's current and/or future planned location, a vehicle service state (e.g., idle, addressing a vehicle service assignment, etc.), and/or other information. In some implementations, the data associated with the autonomous vehicle(s) can be indicative of one or more vehicle constraints such as, for example, one or more time constraints (e.g., that are indicative of a time at which the vehicle will go offline with the service entity), one or more preferred destinations of the vehicle (e.g., where the vehicle would like to be located when it goes offline), one or more restrictions related to vehicle services (e.g., the vehicle only performs delivery services, only performs user transportation services, etc.), vehicle capacity (e.g., number of seats, trunk space, etc.), pre-determined routes traveled by the vehicle (e.g., city loops, etc.), maintenance schedules, and/or other information. The operations computing system can utilize this data to identify autonomous vehicles that are in an idle state (or may become so after the completion of a current vehicle service assignment) and/or that can be re-positioned to help avoid wasting the vehicle's computational resources (e.g., while in an idle state).

To help determine where a vehicle may be re-positioned, the service entity's operations computing system can identify geographic area(s) with a vehicle imbalance. This can include an imbalance in the number of vehicles associated with the geographic area. This can include non-autonomous vehicles and/or autonomous vehicles. In some implementations, the vehicle imbalance can be an autonomous vehicle imbalance. The vehicles associated with a geographic area can be vehicles that are available to perform vehicle service(s) that begin, traverse, and/or end within the geographic area. The vehicle imbalance can include a surplus or a deficit in the number of autonomous vehicles (e.g., non-autonomous vehicles and/or autonomous vehicles) as compared to a demand for the one or more vehicles services. As such, these geographic areas represent opportunities of where the supply of autonomous vehicles can be adjusted to increase the opportunity for an autonomous vehicle to receive vehicle service assignments. These can be geographic areas associated with the service entity (e.g., area(s) in which the service entity offers vehicle service(s), area(s) in which previous vehicle service assignments have been completed, area(s) in which future vehicle service requests are predicted, etc.).

To identify these geographic area(s), the operations computing system can obtain data associated with the geographic area(s). This data can provide a variety of information about the geographic area. For example, the data associated with a geographic area can be indicative of the past, present, and/or future (e.g., known and/or predicted): demand for vehicle services associated with the geographic area (e.g., the number of service requests that begin, end, have an intermediate location within, and/or involve the traversal of the geographic area, etc.), the supply of vehicles within the geographic area (e.g., the number of non-autonomous/autonomous vehicles, etc.), events associated with the geographic area (e.g., concerts, sporting events, performances, etc.), weather conditions associated with the geographic area (e.g., rain, snow, high/low temperatures, etc.), and/or other information. In some implementations, the operations computing system can utilize past and/or current data to project future parameters associated with the geographic area. For example, the operations computing system can predict a future demand for vehicle services within the geographic area based at least in part on a past and/or current demand for vehicle services with like circumstances (e.g., similar time of day, season, occurrence, weather, etc.).

The operations computing system can determine that a geographic area is experiencing an imbalance in the number of vehicles associated with the geographic area based at least in part on the data associated with the geographic area. By way of example, the operations computing system can determine that there should be an increase in the number of vehicles within the geographic area in the event that the current and/or future demand for vehicle service(s) outweighs the current and/or future supply of vehicles within the geographic area (e.g., a deficit). In another example, the operations computing system can determine that there should be a decrease in the number of vehicles within the geographic area in the event that the current and/or future demand for vehicle service(s) is outweighed by the current and/or future supply of vehicles within the geographic area (e.g., a surplus).

The operations computing system can determine that one or more autonomous vehicles should be re-positioned with respect to the geographic area based at least in part on the data indicative of a geographic area and the data associated with the autonomous vehicle(s). Such determination can be made based at least in part on heuristics (e.g., written to identify the optimal candidate vehicles to be re-positioned, etc.) and/or machine-learned models (e.g., trained to recommend autonomous vehicles for re-positioning, etc.). For instance, the operations computing system can utilize the data indicative of a geographic area to determine when (e.g., within a current timeframe and/or within a future timeframe) and what type of vehicle supply adjustment is needed by the geographic area (e.g., increase in the number of autonomous vehicles, a decrease in the number of autonomous vehicles, etc.). The operations computing system can utilize the data associated with the autonomous vehicle(s) to help select which the autonomous vehicle(s) should be re-positioned to implement this vehicle supply adjustment. For example, the operations computing system can analyze the state of the autonomous vehicles to determine which autonomous vehicles are idle and select one or more of the idle vehicles for re-positioning. In another example, the operations computing system can use the location data associated with the autonomous vehicle(s) to determine which autonomous vehicles are closest to the geographic area, within a threshold distance of the geographic area, etc. and select those vehicles to travel to the geographic area to increase the number of available autonomous vehicles within the geographic area (e.g., to address a deficit). In another example, the operations computing system can identify which autonomous vehicles are currently located within the geographic area based at least in part on location data indicative of the vehicles' current position and select those vehicles to travel away from the geographic area to another geographic area (e.g., to address a surplus). In some implementations, the operations computing system may only choose to re-position autonomous vehicles within the service entity's dedicated supply. In some implementations, the operations computing system can choose autonomous vehicle(s) that travel along a pre-determined route that includes and/or is proximate to the geographic area.

In some implementations, the operations computing system can identify autonomous vehicle(s) for re-positioning based at least in part on the vehicle constraint(s). For example, the operations computing system can evaluate the time constraint(s) associated with the autonomous vehicle(s) to determine which autonomous vehicle(s) have sufficient time to travel to the geographic area. For example, the operations computing system may not select a vehicle to re-locate to the geographic area in the event that the vehicle will only be online with the service entity for five more minutes. Additionally, or alternatively, the operations computing system can determine which autonomous vehicles will still be online and available for a re-positioning at future timeframe (e.g., to increase the number of autonomous vehicles in the geographic area at the future timeframe). In some implementations, the operations computing system can consider an autonomous vehicle's preferred destination when identifying vehicles for re-positioning. For example, the operations computing system can determine that an autonomous vehicle has maintenance scheduled at a particular service depot and that the vehicle would prefer to go offline at a location that is near that service depot. As such, the operations computing system can select that autonomous vehicle to be re-positioned to the geographic area in the event that the service depot is located proximate to the geographic area. This can help the autonomous vehicle to efficiently utilize its onboard computing resources.

In some implementations, an autonomous vehicle and/or a vehicle provider can indicate to a service entity that an autonomous vehicle may be re-positioned. For example, the autonomous vehicle itself and/or a computing system associated with a vehicle provider (e.g., a vehicle provider computing system) can determine that the autonomous vehicle has and/or will enter into an idle state. The autonomous vehicle and/or vehicle provider computing system can communicate data, to the operations computing system, indicating that the autonomous vehicle is available for re-positioning and/or requesting a re-positioning assignment. This can be included in the data considered by the operations computing system when selecting autonomous vehicle(s) for re-positioning.

In some implementations, the operations computing system may select at least a subset of a vehicle provider's fleet to be re-positioned with respect to the geographic area. For example, the operations computing system can determine that a vehicle provider is associated with a plurality of autonomous vehicles that are online with the service entity and are in an idle state. The operations computing system can identify at least a portion of the vehicles in that plurality of autonomous vehicles as potential candidates to be re-positioned with respect to the geographic area. However, the operations computing system may not determine which of those autonomous vehicles are to be re-positioned. Instead, the operations computing system can allow the vehicle provider to determine which of the autonomous vehicles in its online fleet are to be re-positioned, as further described herein. This can give the vehicle provider the flexibility to determine which vehicle(s) it prefers to be re-located.

In some implementations, the operations computing system can utilize a more global type of analysis when determining which autonomous vehicles should be re-positioned. For instance, the operations computing system can utilize a cost analysis, machine-learned model, optimization heuristics, etc. to determine what effects the re-positioning of certain autonomous vehicles may have on each of the other autonomous vehicles that are online with the service entity. For example, the operations computing system can determine how re-positioning some autonomous vehicles may affect the number of vehicle service assignments given to another autonomous vehicle as well as the potential increase in idle time for that other autonomous vehicle. The operations computing system can perform a cost analysis to determine the least costly approach across all of the autonomous vehicles that are online with the service entity (e.g., the re-positioning determination that leads to the lowest amount of vehicle idle time).

To implement its determined re-positioning strategy, the operations computing system can communicate one or more re-positioning assignments associated with the selected autonomous vehicles. The re-positioning assignment(s) can indicate that the autonomous vehicle(s) are to be re-positioned with respect to the geographic area. For example, a re-positioning assignment can indicate that the autonomous vehicle(s) are to travel to the geographic area. The re-positioning assignment can include a location identifier associated with the geographic area (e.g., a set of latitude/longitude coordinates, an area, an address, etc.). The re-positioning assignment can indicate that an autonomous vehicle is to arrive at, get as close as possible to, get within a distance of (e.g., a threshold distance of, a reasonable walking distance of, etc.), circle nearby, etc. that location. In another example, a re-positioning assignment can indicate that the autonomous vehicle(s) are to travel away from the geographic area. In some implementations, the re-positioning assignment can merely indicate that the autonomous vehicle(s) are to travel until they are outside of the geographic area. In some implementations, the re-positioning assignment can indicate the location identifier of another geographic area to which the autonomous vehicle(s) are to travel (e.g., when leaving the geographic area that needs to decrease its number of autonomous vehicles).

In some implementations, the re-positioning assignment(s) can be indicative of a route and/or a task for the autonomous vehicle. For instance, a re-positioning assignment can indicate a travel route for an autonomous vehicle to follow to the geographic area. This can include a route that the operations computing system has determined will allow the autonomous vehicle to utilize the least amount of its onboard computational resources while traveling to the geographic area, the route with the fastest time to the geographic area, the route with the shortest distance to the geographic area, the route with the most familiar travel ways, etc. In some implementations, the re-positioning assignment can be indicative of a task for the autonomous vehicle. This can be a task that the autonomous vehicle is to perform while travelling in accordance with the identified route. For example, the task can include the acquisition of sensor data of a particular travel way that has experienced a change in conditions (e.g., new bridge, new sidewalks, added travel lane(s), etc.).

The re-positioning assignment(s) can include a re-positioning command or a re-positioning request. For example, a re-positioning assignment can be formulated as a command for the autonomous vehicle(s) to be re-positioned with respect to the geographic area. The command may not be rejected. Accordingly, the operations computing system can utilize such commands for the autonomous vehicle(s) that are included in the dedicated supply of the service entity (e.g., the vehicle(s) that will not reject the re-positioning assignment unless physically impaired from complying). In some implementations, the re-positioning assignment can be formulated as a request for the autonomous vehicle(s) to be re-positioned with respect to the geographic area. The request may be accepted or rejected. Accordingly, the operations computing system can utilize such requests for the autonomous vehicle(s) that are included in the non-dedicated supply of the service entity (e.g., the vehicle(s) that have the ability to accept or reject the re-positioning assignment). In some implementations, a re-positioning assignment can include an incentive to help entice an acceptance of the re-positioning assignment. The incentive can include, for example, an increase in the compensation for the autonomous vehicles next vehicle service assignment(s), increased rating, priority treatment for vehicle service assignment(s), etc.

The re-positioning assignment(s) can be communicated directly or indirectly to the autonomous vehicle(s). For example, the operations computing system can communicate data indicative of a re-positioning assignment directly to an autonomous vehicle that is online with the service entity (e.g., via the service entity's platform/network, etc.). Additionally, or alternatively, data indicative of the re-positioning assignment(s) can be communicated to a vehicle provider associated with the autonomous vehicle(s). For example, as described herein, the operations computing system can determine that a plurality of autonomous vehicles are candidates for re-positioning and that it would be satisfied if any of these autonomous vehicles are re-positioned with respect to the geographic area. The operations computing system can communicate the re-positioning assignment(s) to the vehicle provider's computing system, which can in turn select which of the autonomous vehicle(s) are to be re-positioned and communicate with those vehicle(s) accordingly.

In some implementations, a re-positioning assignment can be overridden by a vehicle service assignment. For example, an idle autonomous vehicle can obtain a re-positioning assignment and begin to travel to a geographic area, as instructed. While en route to the geographic area, the autonomous vehicle may obtain a vehicle service assignment. As such, the autonomous vehicle can accept and address the vehicle service assignment (e.g., travel to pick-up a user, etc.), before completing the re-positioning assignment. In another example, the operations computing system can communicate a re-positioning assignment to an autonomous vehicle that is currently addressing a vehicle service assignment (e.g., travelling to pick-up a user/item, transporting the user/item, etc.). The operations computing system may do so in order to forward deploy the re-positioning assignment so that the autonomous vehicle will perform the re-positioning assignment after completing the vehicle service assignment. In the event that the autonomous vehicle obtains a subsequent vehicle service assignment, the autonomous vehicle can accept the vehicle service assignment before addressing the re-positioning assignment.

In some implementations, the operations computing system can confirm that an autonomous vehicle has undertaken the re-positioning assignment. For example, the operations computing system can obtain data indicative of an acceptance of the re-positioning assignment from an autonomous vehicle. Additionally, or alternatively, the operations computing system can determine whether the autonomous vehicle is autonomously re-positioning itself with respect the geographic area. For example, the operations computing system can obtain data indicative of a vehicle's motion plan to determine whether the autonomous vehicle intends to travel to (or travel away from) the geographic area as instructed. Additionally, or alternatively, the operations computing system can determine whether the autonomous vehicle arrived at the geographic area based at least in part on location data (e.g., GPS data, etc.) associated with the autonomous vehicle.

The operations computing system can communicate data indicative of a vehicle service assignment associated with the geographic area to an autonomous vehicle. For instance, after confirming that an autonomous vehicle is travelling in accordance with the re-positioning assignment and/or has already arrived at the geographic area, the operations computing system can communicate a vehicle service assignment associated with the geographic area to the vehicle. This can include, for example, a transportation service that has a destination location within the geographic area, a transportation service that has an origin location within the geographic area, etc.

In some implementations, the operations computing system can incentivize a vehicle provider to re-position at least a portion of its vehicle fleet to an imbalanced geographic area. For instance, the operations computing system can determine that the geographic area has a vehicle imbalance (e.g., an imbalance in a number of non-autonomous and/or autonomous vehicles associated with the geographic area), as described herein. The operations computing system can generate a vehicle service incentive associated with the geographic area that has the vehicle imbalance. A vehicle service incentive can be an enticement to a vehicle provider to re-position one or more of its associated autonomous vehicles with respect to the geographic area (e.g., to travel to the geographic area, to travel away from the geographic area, etc.). In this way, rather than selecting autonomous vehicles for re-positioning with respect to the imbalanced geographic area, the operations computing system can generate a vehicle service incentive that may entice a vehicle provider to do so.

In some implementations, the vehicle service incentive can be a financial incentive associated with the geographic area that has the vehicle imbalance. By way of example, the vehicle service incentive can include a payment to the vehicle provider (and/or an autonomous vehicle) for re-positioning the autonomous vehicle with respect to the geographic area (e.g., travelling to the geographic area, travelling away from, etc.). Additionally, or alternatively, a vehicle service incentive can include an increase in the compensation parameter associated with a requested vehicle service. For example, an autonomous vehicle (or a vehicle provider associated therewith) can receive an increased payment for transporting a user from one location within the geographic area to another (e.g., receive a greater amount of money than would normally be paid in circumstances where there is not a vehicle imbalance).

In some implementations, a vehicle service incentive can include other types of incentives. For instance, a vehicle service incentive can include an increase in a rating parameter associated with the autonomous vehicle (e.g., that is to be re-positioned) and/or the vehicle provider. By way of example, the service entity can maintain a profile associated with a particular autonomous vehicle and/or a profile associated with a particular vehicle provider. A profile can include a rating parameter that is reflective of how well (or poorly) the autonomous vehicle has performed vehicle services and/or how well (or poorly) the vehicle provider's fleet has performed vehicle services. This can be a reflection of how satisfied users are with the autonomous vehicle (and/or its associated vehicle provider), how satisfied a service entity is with the autonomous vehicle (and/or its associated vehicle provider), etc. In some implementations, such a rating can be increased when an autonomous vehicle is re-positioned with respect to a geographic area and/or when an autonomous vehicle accepts a vehicle service assignment associated with the geographic area.

In some implementations, the vehicle service incentive can be associated with a predetermined time period. For example, the vehicle service incentive can include an increased compensation parameter for a set portion of a day. Additionally, or alternatively, the vehicle service incentive can be associated with a future time frame when the vehicle imbalance is expected to occur (e.g., during a sporting event, concert, and/or other event within the geographic area, etc.).

The operations computing system can communicate data indicative of the vehicle service incentive to one or more vehicle provider computing systems associated with one or more different vehicle providers. A vehicle provider computing system can be configured to select at least one of the vehicle provider's autonomous vehicle(s) for re-positioning with respect to the geographic area. For instance, a first vehicle provider computing system associated with a first vehicle provider can determine which of the autonomous vehicle(s) in the first vehicle provider's fleet are to be re-positioned (if any) with respect to the geographic area. The first vehicle provider computing system can select, for example, autonomous vehicle(s) that are online with the service entity associated with the vehicle service incentive, autonomous vehicle(s) that are in an idle state, autonomous vehicle(s) that are closest to the geographic area, etc. The first vehicle provider computing system can communicate data indicative of a re-positioning assignment and/or other data to cause a selected autonomous vehicle to re-position itself with respect to the geographic area (e.g., autonomously travel to the geographic area, autonomously travel away from the geographic area, etc.).

In some implementations, more than one vehicle provider can re-position its autonomous vehicles with respect to the geographic area. For example, a second vehicle provider computing system associated with a second vehicle provider (e.g., that is different than the first vehicle provider) can select an autonomous vehicle to be re-positioned with respect to the geographic area. In this way, the service entity can leverage several different vehicle providers to re-position autonomous vehicles so as to increase the likelihood that the imbalance will be addressed.

The operations computing system can confirm that an autonomous vehicle is being or has been re-positioned with respect to the geographic area. For example, as similarly described herein, the operations computing system can obtain data indicative of a motion plan of an autonomous vehicle and/or vehicle location data. The operations computing system can utilize the motion planning data and/or the vehicle location data to determine that the autonomous vehicle intends to travel to, is travelling to, and/or is located within a geographic area. In some implementations, the vehicle provider computing system and/or an autonomous vehicle can communicate, to the operations computing system (e.g., via an API of the service entity), data indicating that the autonomous vehicle is being or has been re-positioned with respect to an imbalanced geographic area.

In some implementations, a service entity can cancel a vehicle service incentive. For instance, the service entity's operations computing system can determine that a certain number of autonomous vehicles (e.g., five, ten, fifteen, etc.) need to be added to a geographic area to address a deficit in the number of autonomous vehicles within the area. The operations computing system can confirm that the necessary number of autonomous vehicles has been re-positioned with respect to the geographic area. Accordingly, the operations computing system can cancel the vehicle service incentive. In some implementations, the cancellation of a vehicle service incentive may only be applicable to the vehicle providers that did not re-position any autonomous vehicles with respect to the geographic area. For example, the operations computing system can communicate data indicating that the vehicle service incentive is no longer available to autonomous vehicles (e.g., that are not being or have not been re-positioned with respect to the geographic area) and/or the associated vehicle providers. In some implementations, the vehicle service incentive may remain available to one or more autonomous vehicles that were re-positioned with respect to the geographic area (and/or the associated vehicle provider(s)) even after the cancellation. This can include, for example, autonomous vehicle(s) that were selected for re-positioning, being re-positioned, had been re-positioned, etc. with respect to the geographic area prior to the cancellation of the vehicle service incentive.

An autonomous vehicle that is being and/or has been re-positioned with respect to the geographic area can obtain a vehicle service assignment that is based at least in part on the service entity's vehicle service incentive. For instance, the service entity's operations computing system can obtain data indicative of a vehicle service request for a vehicle service associated with the geographic area. This can include, for example, a request for a user to be transported from one location within the geographic area to another. The operations computing system can generate data indicative of a vehicle service assignment based at least in part on the vehicle service incentive and the vehicle service request. For example, the operations computing system can generate a vehicle service assignment that requests an autonomous vehicle to transport the user for a higher level of compensation than would normally be provided for such a request. The operations computing system can provide data indicative of the vehicle service assignment to the autonomous vehicle (e.g., that was selected for re-positioning) and/or the vehicle provider computing system associated with the vehicle provider. The autonomous vehicle (and/or a vehicle provider computing system) can accept the vehicle service assignment to receive the incentive in accordance with the performance of the requested vehicle service.

The systems and methods described herein provide a number of technical effects and benefits. More particularly, the systems and methods of the present disclosure provide improved techniques for decreasing idle data usage and autonomous vehicle downtime. To do so, aspects of the present disclosure allow a computing system to re-position autonomous vehicle(s) to imbalanced geographic areas so that the autonomous vehicles are more likely to obtain vehicle service assignments, thereby, increasing the utilization rate of the autonomous vehicle. Moreover, such re-positioning can help reduce the amount of idle time experienced by the autonomous vehicle. This can decrease the amount of processing, memory, and power resources that the autonomous vehicle uses to perceive its surrounding environment while it is idle. Ultimately, this can lead to less vehicle downtime caused by trips to a service depot to downlink data, re-charge the vehicle's power sources, etc. This can also improve user wait time, increase vehicle compensation, increase the ability of the autonomous vehicles to meet service goals, etc.

Example aspects of the present disclosure can provide an improvement to vehicle computing technology, such as autonomous vehicle computing technology. For instance, the systems and methods of the present disclosure provide an improved approach to preserving the computational resources of an autonomous vehicle. For example, a computing system (e.g., an operations computing system of a service entity) can obtain data associated with one or more autonomous vehicles that are online with a service entity (e.g., and in an idle state). The computing system can obtain data indicative of a geographic area with an imbalance in the number of vehicles associated with the geographic area (e.g., vehicle deficit, vehicle surplus, etc.). The computing system can determine a first autonomous vehicle of the one or more autonomous vehicles for re-positioning with respect to the geographic area (e.g., to adjust the number of autonomous vehicles associated with the geographic area). The computing system can communicate data indicative of a re-positioning assignment for the first autonomous vehicle. The re-positioning assignment can be indicative of the re-positioning of the first autonomous vehicle with respect to the geographic area. In this way, the computing system can decrease autonomous vehicle idle time and the amount of computational resources that an autonomous vehicle uses while it is idle. Moreover, the computing system can strategically determine which autonomous vehicle(s) to re-position so that the re-positioning is performed in the most efficient manner. For example, an autonomous vehicle that prefers to end its day at a service depot located nearby the geographic area can be selected for such re-positioning. Accordingly, the computing system re-position the autonomous vehicle(s) so that the processing, memory, and power resources of the vehicle's computing system are more likely to be utilized for performing vehicle services (as opposed to vehicle idling). This leads to a more effective use of a vehicle's computational resource, while reducing the need for autonomous vehicle's to go offline to replenish such resources.

Example aspects of the present disclosure can improve the ability of a computing system to leverage other vehicle provider computing systems to help address a vehicle imbalance. For instance, a computing system (e.g., operations computing system of a service entity) can leverage one or more vehicle providers to address a vehicle imbalance by enticing the vehicle provider(s) to re-position autonomous vehicles. By way of example, a computing system can obtain data associated with the geographic area. The computing system can determine that the geographic area has a vehicle imbalance based at least in part on the data associated with the geographic area. Moreover, the computing system can generate data indicative of a vehicle service incentive associated with the geographic area that has the vehicle imbalance. This can entice vehicle providers to re-position autonomous vehicles with respect to the geographic area. The computing system can communicate the data indicative of the vehicle service incentive to a computing system associated with a vehicle provider. In this way, the operations computing system can entice a vehicle provider to utilize the vehicle provider computing system to re-position autonomous vehicle(s) to the geographic area. This allows an operations computing system of a service entity to leverage the computational resources of the vehicle providers to select and re-position autonomous vehicles to address an imbalanced area (e.g., via vehicle service incentive). This allows the operations computing system to save its computational resources to be utilized for other core functionality (e.g., vehicle service coordination, vehicle support, etc.).

With reference now to the FIGS., example embodiments of the present disclosure will be discussed in further detail. FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for controlling an autonomous vehicle, recognizing that an autonomous vehicle is to be re-positioned, identifying a geographic area, directed an autonomous vehicle to be re-positioned, etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can also include other sensors configured to acquire data associated with the autonomous vehicle 105. For example, the autonomous vehicle 105 can include inertial measurement unit(s), wheel odometry devices, and/or other sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) 180 for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

Figure 2:
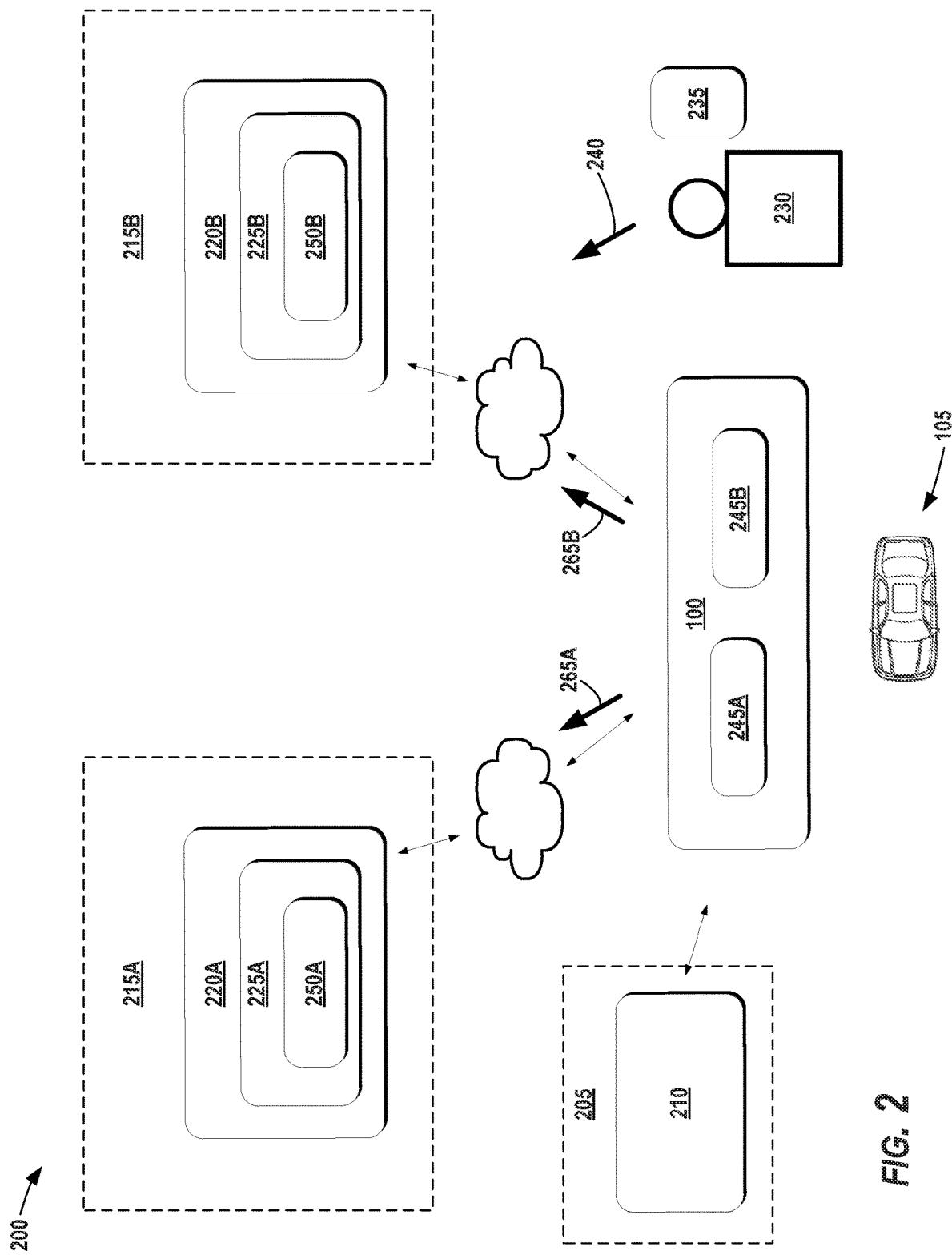
FIG. 2 depicts example service entity network(s) for an autonomous vehicle according to example embodiments of the present disclosure.

The autonomous vehicle 105 can be associated with a variety of different parties. For example, FIG. 2 depicts an example architecture 200 according to example embodiments of the present disclosure. As shown, the vehicle computing system 100 of the autonomous vehicle 105 can be configured to communicate with a plurality of different computing systems that are remote from the autonomous vehicle 105 via the architecture 200.

In some implementations, the autonomous vehicle 105 can be associated with a vehicle provider 205. The vehicle provider 205 can include, for example, an owner, a manufacturer, a vendor, a manager, a coordinator, a handler, etc. of the autonomous vehicle 105. The vehicle provider 205 can be an individual, a group of individuals, an entity (e.g., a company), a group of entities, a service entity, etc. In some implementations, the autonomous vehicle 105 can be included in a fleet of vehicles associated with the vehicle provider 205. The vehicle provider 205 can utilize a vehicle provider computing system 210 that is remote from the autonomous vehicle 105 to communicate (e.g., over one or more wireless communication channels) with the vehicle computing system 100 of the autonomous vehicle 105. The vehicle provider computing system 210 can include a server system (e.g., of an entity), a user device (e.g., of an individual owner), and/or other types of computing systems.

The autonomous vehicle 105 can be configured to perform vehicle services for a plurality of different service entities 215A-B. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity 215A-B can be associated with a respective telecommunications network system 220A-B of that service entity. A telecommunications network system can include the infrastructure to facilitate communication between the autonomous vehicle 105 and the various computing systems of the associated service entity that are remote from the autonomous vehicle 105. For example, a service entity 215A-B can utilize an operations computing system 225A-B of the service entity to communicate with, coordinate, manage, etc. autonomous vehicle(s) to perform the vehicle services of the service entity 215A-B. The telecommunications network 220A-B can allow an autonomous vehicle 105 to utilize the back-end functionality of the operations computing system 225A-B (e.g., vehicle service assignment allocation, vehicle technical support, etc.).

An operations computing system 225A-B can include one or more computing devices that are remote from the autonomous vehicle 105 (e.g., located off-board the autonomous vehicle 105). For example, such computing device(s) can be components of a cloud-based server system and/or another type of computing system that can communicate with the vehicle computing system 100 of the autonomous vehicle 105, another computing system (e.g., a vehicle provider computing system 210, etc.), a user device, etc. The operations computing system 225A-B can be distributed across one or more location(s) and include one or more subsystems. The computing device(s) of an operations computing system 225A-B can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 225A-B (e.g., the one or more processors, etc.) to perform operations and functions, such as communicating data to and/or obtaining data from vehicle(s), obtaining data associated with geographic area(s), identifying vehicle imbalances, re-positioning vehicles, coordinating the provision of vehicle services by vehicle(s), etc. as further described herein.

An operations computing system 225A can communicate with an autonomous vehicle 105 via the service entity's computing platform. A computing platform of a service entity 215A-B can provide the vehicle computing system 100 and the operations computing system 225A-B with a computing environment that allows the systems to communicate. A computing platform can include a variety of computer architectures. Moreover, the computing platform can include the software, hardware, application programming interface(s), etc. that are associated with the service entity 215A-B. Each service entity 215A-B may have a different computing platform that can allow the service entity's operations computing system 225A-B and the vehicle computing system 100 to communicate via the telecommunications network system 220A-B associated with the service entity. In some implementations, one or more service entities may utilize the same computing platform.

One or more of the components of a computing platform can be accessible by the vehicle computing system 100. For instance, to help communicate with the various different service entities 215A-B, a vehicle computing system 100 of the autonomous vehicle 105 can include a plurality of vehicle clients 245A-B, each associated with a different service entity 215A-B. For example, the autonomous vehicle 105 can include a first vehicle client 245A associated with a first service entity 215A and a second vehicle client 245B associated with a second service entity 215B (e.g., that is different than the first service entity 215A). A vehicle client can be a software platform component of the service entity's computing platform, that is stored onboard an autonomous vehicle 105. For example, a vehicle client can include firmware, software (e.g., a software application), etc. that is stored onboard the vehicle 100 (and/or in an offboard memory that is accessible by the autonomous vehicle 105) and that can allow the vehicle computing system 100 to communicate data to and/or obtain data from the operations computing system 225A-B associated with a service entity 215A-B. For example, a vehicle client 245A-B can allow the vehicle computing system 100 to receive data indicative of one or more vehicle service assignments from an associated service entity 215A-B. The vehicle client 245A-B can be provided to an autonomous vehicle 105 by an operations computing system 225A-B associated with a service entity 215A-B, provided to a vehicle provider computing system 210 that can then help implement the vehicle client 245A-B on the autonomous vehicle 105 (e.g., by communicating a configuration to the vehicle computing system 100), and/or other approaches. In some implementations, the operations computing system 225A-B and the vehicle computing system 100 can indirectly communicate. For example, the vehicle provider computing system 210 can serve as an intermediary between the operations computing system 225A-B and the vehicle computing system 100 such that at least some data is communicated from the operations computing system 225A-B (or the vehicle computing system 100) to the vehicle provider computing system 210 and then to the vehicle computing system 100 (or the operations computing system 225A-B).

A vehicle client 245A-B can be implemented via hardware and/or software onboard the autonomous vehicle 105. The vehicle computing system 100 can utilize the vehicle client 245A-B to access an application programming interface 250A-B associated with a service entity 215A-B. For example, the vehicle computing system 100 can invoke, via a vehicle client 245A-B, the application programming interface 250A-B to access a library indicative of a plurality of parameters. The library can include, for example, a central repository for parameters that can be used to generate a communication (e.g., query string, message, data set, etc.) to be sent to the service entity's operations computing system. In some implementations, each service entity 215A-B can be associated with a different application programming interface 250A-B. For example, a first service entity 215A can be associated with a first application programming interface 250A and a second service entity 215B can be associated with a second application programming interface 250B (e.g., which is different from the first application programming interface 250A). Additionally, or alternatively, one or more service entities can utilize the same application programming interface and/or the first and second application programming interfaces 250A-B can be the same (or at least similar).

A user 230 can request a vehicle service from a service entity 215A-B. For example, the user 230 can provide user input to a user device 235 to request a vehicle service (e.g., via a user interface associated with a mobile software application of the service entity, etc.). The user device 235 can communicate (e.g., directly and/or indirectly via another computing system) data 240 indicative of a request for a vehicle service to an operations computing system 225A-B associated with the service entity 215A-B. The request can indicate the type of vehicle service that the user 230 desires (e.g., a transportation service, a delivery service, a courier service, etc.), one or more locations (e.g., an origin location, a destination location, etc.), timing constraints (e.g., pick-up time, drop-off time, deadlines, etc.), a number of user(s) and/or items to be transported in the vehicle, one or more other service parameters (e.g., a need for handicap access, a need for trunk space, etc.), and/or other information. The operations computing system 225A-B of the service entity 215A-B can process the data 240 indicative of the request and generate a vehicle service assignment that is associated with the service request.

The operations computing system 225A-B of the service entity 215A-B can process the request and identify one or more autonomous vehicles that may be able to perform the requested vehicle services for the user 230. For instance, the operations computing system 225A-B can identify which vehicle(s) are online with the service entity.

An autonomous vehicle can be online with a service entity so that the autonomous vehicle is available to obtain data indicative of a vehicle service assignment associated with the service entity, so that the autonomous vehicle is available to address a vehicle service assignment, so that the autonomous vehicle is available to perform a vehicle service for the service entity, etc. For example, an autonomous vehicle 105 can go online with a service entity. An autonomous vehicle that is online with a service entity can be, for example, a vehicle that has performed one or more of: launching a vehicle client associated with the service entity, accessing an API associated with the service entity, establishing a communication systems with a computing system of the service entity, connecting to a computing platform and/or a telecommunications network of the service entity, and/or taken other actions to go online with the service entity. The online vehicle can be able to communicate with the serve entity's computing system, for example, to obtain data (e.g., data indicative of vehicle service assignments).

For instance, the vehicle computing system 100 can go online with the computing platform and/or a first telecommunications network 220A of a first service entity 215A such that the autonomous vehicle 105 is able to communicate with the operations computing system 225A of the first service entity 215A. This can allow the vehicle computing system 100 to obtain data indicative of one or more vehicle service assignments associated with the first service entity 215A. By way of example, as described herein, the vehicle computing system 100 can include a first vehicle client 245A associated with the first service entity 215A. The vehicle computing system 100 can indicate the vehicle's availability to perform vehicle services and/or obtain vehicle service assignments from the first service entity. This can include launching the first vehicle client 245A. The vehicle computing system 100 can establish a first communication session with a first remote computing system associated with the first service entity 215A (e.g., the operations computing system 225A). The communication session can be opened based at least in part on a first application programming interface 250A associated with the first service entity 215A. For instance, the vehicle computing system 100 can access, via the first vehicle client 245A, the first application programming interface 250A associated with the first service entity 215A. The vehicle computing system 100 can generate a first communication 265A (e.g., data string, etc.) based at least in part on the first application programming interface 250A (e.g., based on the defined parameters thereof, etc.). The first communication 265A can indicate that the autonomous vehicle 105 is online with the first service entity 215A. The first communication 265A can indicate that the autonomous vehicle 105 is available to perform at least one first vehicle service for the first service entity 215A and/or is available to obtain vehicle service assignment(s) associated with the first service entity 215A (e.g., a computing system associated therewith). The vehicle computing system 100 can provide the first communication 265A to the operations computing system 225A of the first service entity 215A to indicate that the autonomous vehicle 105 is online with the first service entity 215A and that the autonomous vehicle 105 is available to perform vehicle service(s) for the first service entity 215A. Additionally, or alternatively, the vehicle computing system 100 can provide the first communication 265A to the vehicle provider computing system 210, which can provide the first communication 265A (or similar such data) to the operations computing system 225A to indicate that the autonomous vehicle 105 is online with the service entity and that the autonomous vehicle 105 is available to perform vehicle service(s) for the first service entity 215A. In some implementations, the vehicle provider computing system 210 can perform similar operations to communicate with the operations computing system of a service entity via an application programming interface.

A similar such approach can be utilized by the vehicle computing system 100 to go online with a second service entity 215B. For example, the vehicle computing system 100 can access, via the second vehicle client 245B, the second application programming interface 250B associated with the second service entity 215B. The vehicle computing system 100 can generate a second communication 265B based at least in part on the second application programming interface 250B. The second communication 265B can indicate that the autonomous vehicle 105 is online with the service entity 215B. The second communication 265B can indicate that the autonomous vehicle 105 is available to perform at least one second vehicle service for the second service entity 215B and/or is available to obtain vehicle service assignment(s) associated with the second service entity 215B (e.g., a computing system associated therewith).

Example embodiments of the present disclosure describe operations and functions performed by an operations computing system, a vehicle provider computing system, and/or a vehicle computing system for illustrative purposes. One or more of the operations and functions described as being performed by one system can be performed by another. For example, the operations and functions of an operations computing system of a service entity can be performed by another computing system (e.g., the vehicle provider computing system 210, the vehicle computing system 100, etc.), and vice versa, and/or any combination thereof.

Figure 3:
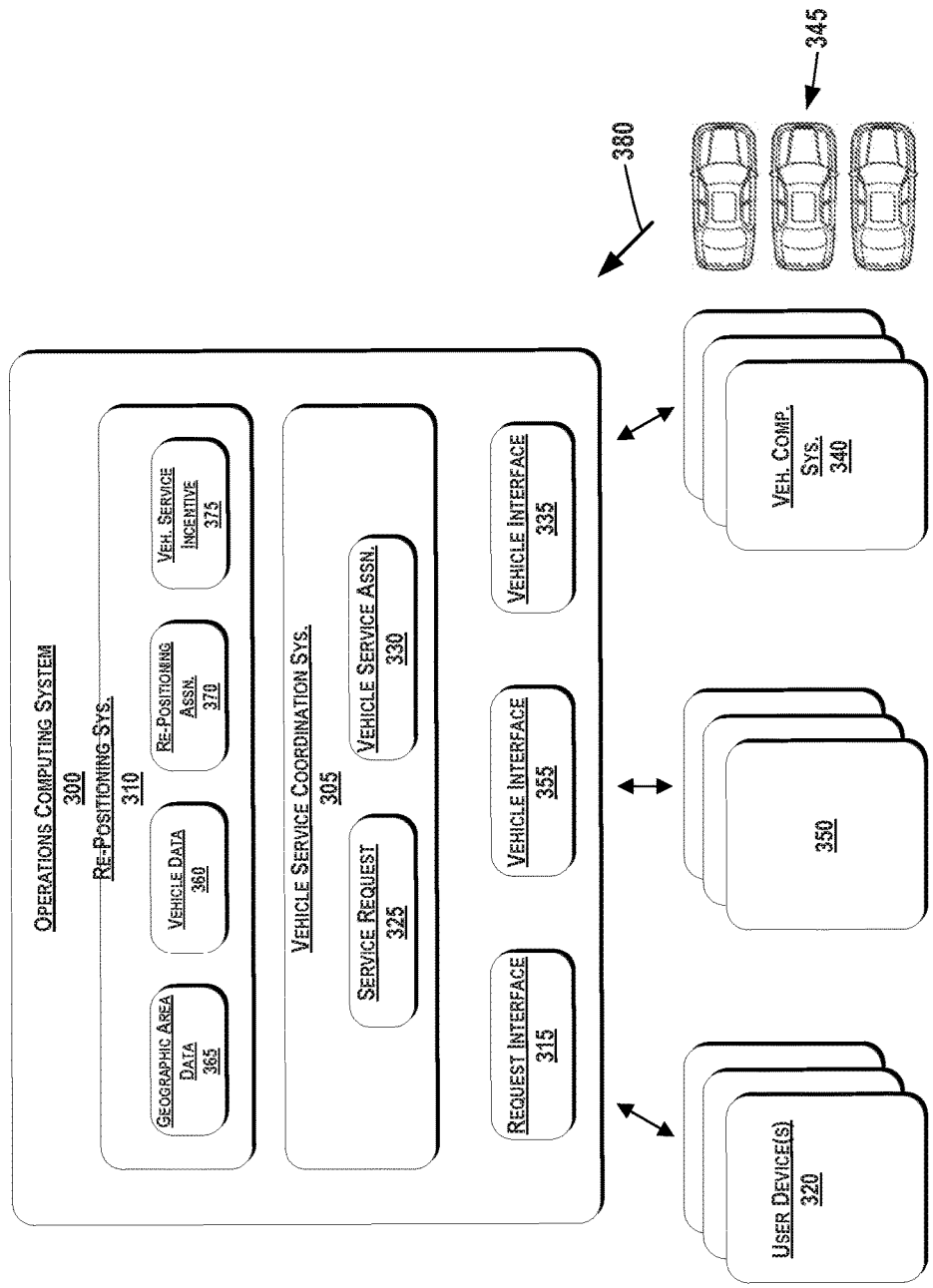
FIG. 3 depicts an example operations computing system of a service entity according to example embodiments of the present disclosure.

An operations computing system can be configured to position one or more vehicles (e.g., that are online with an associated service entity) to reduce vehicle downtime and idle data usage. For example, FIG. 3 depicts an example operations computing system 300 of a service entity according to example embodiments of the present disclosure. The operations computing system 300 can be associated with a service entity. The operations computing systems 225A-B of FIG. 2 associated with the respective service entities 215A-B, and/or otherwise described herein, can be or can be configured in a similar manner to the operations computing system 300. The operations computing system 300 can include a vehicle service coordination system 305, a vehicle re-positioning system 310, and/or other systems.

The vehicle service coordination system 305 can be configured to coordinate the provision of one or more vehicle services to one or more users. For instance, the operations computing system 300 can include a request interface 315. The request interface 315 can allow the operations computing system 300 to communicate with one or a plurality of user devices 320 (e.g., mobile phones, desktops, laptops, etc.). The user device(s) 320 can be and/or can include the user device 230 of FIG. 2. The request interface 315 can allow the operations computing system 300 and the user device(s) 320 to communicate data to and/or from one another. For example, the user device(s) 320 can communicate (e.g., via the request interface 315) data indicative of a service request 325 for a vehicle service to an operations computing system 300 associated with a service entity.

The vehicle service coordination system 305 can be configured to generate a vehicle service assignment 330. A vehicle service assignment 330 can be indicative of a vehicle service (e.g., requested by a user via the user device(s) 320) to be performed by a vehicle (e.g., an autonomous vehicle). A vehicle service assignment 330 can include a variety of information associated with the vehicle service, the requesting user, the user device, the service entity, etc. For example, a vehicle service assignment 330 can include data indicative of an associated user and/or user device (if permitted), data indicative of a compensation parameter (e.g., the compensation for delivering an item to a user, couriering an item for a user, transporting a user, etc.), data indicative of one or more locations (e.g., origin location, destination location, intermediate location, etc.), data indicative of a type of vehicle service (e.g., transportation service, delivery service, courier service, etc.), data indicative of the type of cargo for the vehicle service (e.g., passengers, luggage, packages, food, time-sensitive mail, etc.), data indicative of a vehicle type/size (e.g., sedan, sport utility vehicle, luxury vehicle, etc.), data indicative of one or more time constraints (e.g., pick-up times, drop-off times, time limits for delivery, service duration, etc.), data indicative of user preferences (e.g., music, temperature, etc.), data indicative of one or more vehicle service parameters (e.g., luggage, handle-with-care instructions, special pick-up requests, etc.), data indicative of the vehicle capacity required/preferred for the vehicle service (e.g., the number of seats with seatbelts, an amount of trunk space, etc.), data indicative of user ratings, data indicative of one or more vehicle service incentives (as further described herein), and/or other types of data.

The operations computing system 300 (e.g., the vehicle service coordination system 305) can identify one or more autonomous vehicles that are available for a vehicle service assignment 330. The vehicle service coordination system 305 can identify autonomous vehicle(s) that are online with the service entity associated with the operations computing system 300. The vehicle service coordination system 305 can select an autonomous vehicle for the vehicle service assignment based at least in part on the data indicated in the vehicle service assignment. For example, the vehicle service coordination system 305 can select an autonomous vehicle that meets the preferences of the user, has the necessary capacity, is the requested vehicle type, etc. Additionally, or alternatively, the vehicle service coordination system 305 can select an autonomous vehicle based at least in part on the current and/or future location of the autonomous vehicle. For example, the vehicle service coordination system 305 can select an autonomous vehicle that is proximate to an origin location associated with the vehicle service assignment 330. Additionally, or alternatively, the vehicle service coordination system 305 can select an autonomous vehicle that is within and/or nearby a geographic area that includes the origin location and/or destination location of the vehicle service assignment 330.

The operations computing system 300 can utilize a vehicle interface 335 to communicate data indicative of a vehicle service assignment 330 to one or more vehicle computing systems 340 of one or more autonomous vehicles 345. The vehicle computing system(s) 340 can include the vehicle computing system 100 and/or be configured in similar manner (e.g., as shown in FIG. 1) and the autonomous vehicle(s) 345 can include the autonomous vehicle 105. The vehicle interface 335 can allow the operations computing system 300 and one or a plurality of vehicle computing systems 340 (e.g., of one or more autonomous vehicles 345) to communicate data to and/or from one another. For example, the operations computing system 300 can communicate, via the vehicle interface 335, data indicative of a vehicle service assignment 330 to one or more vehicle computing system(s) 340 of the autonomous vehicles 345 that the operations computing system 300 selects for the vehicle service assignment 300. Additionally, or alternatively, the vehicle computing system(s) 340 can communicate data associated with the autonomous vehicle(s) 345 to the operations computing system 300. In this way, the operations computing system 300 can coordinate the performance of vehicle service(s) for user(s) by the autonomous vehicle(s) 345 as well as monitor the autonomous vehicle(s) 345 (e.g., that are online with the service entity).

The operations computing system 300 can communicate with one or more vehicle provider computing systems 350 (associated with one or more vehicle providers) via a vehicle provider interface 355. The vehicle provider computing system(s) 350 can include and/or be configured in a similar manner to the vehicle provider computing system 210 (shown in FIG. 2). The vehicle provider computing system(s) 350 can be associated with vehicle providers that are associated with the autonomous vehicle(s) 345. The vehicle provider interface 355 can allow the operations computing system 300 and one or a plurality of vehicle provider computing systems 350 (e.g., of one or more vehicle providers, etc.) to communicate data to and/or from one another. For example, the operations computing system 300 can communicate, via the vehicle provider interface 355, data indicative of a vehicle service assignment 330, and/or other data as described herein, to one or more vehicle provider computing system(s) 350. The vehicle provider computing system(s) 350 can then communicate such data to the vehicle computing system(s) 340. Additionally, or alternatively, the vehicle provider computing system(s) 350 can communicate data associated with one or more autonomous vehicles 345 (and/or other data) to the operations computing system 300.

A service entity may have varying levels of control over the autonomous vehicle(s) 345 that perform its vehicle services. In some implementations, an autonomous vehicle 345 can be included in the service entity's dedicated supply of vehicles. The dedicated supply can include autonomous vehicles that are owned, leased, or otherwise exclusively available to the service entity (e.g., for the provision of its vehicle service(s), other tasks, etc.) for at least some period of time. This can include, for example, an autonomous vehicle 345 that is associated with a vehicle provider, but that is online only with that service entity (e.g., available to accept vehicle service assignments for only that service entity, etc.) for a certain time period (e.g., a few hours, a day, week, etc.).

In some implementations, an autonomous vehicle 345 can be included in the service entity's non-dedicated supply of vehicles. This can include vehicles that are not exclusively available to the service entity. For example, an autonomous vehicle 345 that is currently online with two different service entities (e.g., concurrently online with a first service entity 215A and a second service entity 215B, etc.) so that the autonomous vehicle 345 may accept vehicle service assignment(s) 330 from either service entity (e.g., the operations computing systems associated therewith, etc.) may be considered to be part of a non-dedicated supply of autonomous vehicles. In some implementations, whether an autonomous vehicle 345 is considered to be part of the dedicated supply or the non-dedicated supply can be based, for example, on an agreement between the service entity and a vehicle provider associated with the autonomous vehicle 345.

A service entity can seek to decrease the amount of time that the autonomous vehicle(s) 345 are in an idle state. An idle state can be a state in which the autonomous vehicle is not addressing a vehicle service assignment and/or performing a vehicle service. This can include the time between vehicle service assignments. To help decrease the amount of idle time, the operations computing system 300 can obtain data 360 associated with one or more autonomous vehicles 345 that are online with the service entity (e.g., a first service entity 215A). This can include an autonomous vehicle 345 that is in an idle state. In some implementations, the one or more autonomous vehicles 345 can be a part of the service entity's dedicated supply. In some implementations, the one or more autonomous vehicles 345 can be a part of the service entity's non-dedicated supply. Moreover, the one or more autonomous vehicle(s) 345 can be included in the vehicle fleet of a vehicle provider and are online with the service entity (e.g., the first service entity 215A). The data 360 associated with the one or more autonomous vehicles 345 can be indicative of a vehicle's: online/offline status, the vehicle's current and/or future planned location, a vehicle service state (e.g., idle, addressing a vehicle service assignment, etc.), whether the vehicle is in the service entity's dedicated or non-dedicated supply, and/or other information. In some implementations, the data 360 associated with the autonomous vehicle(s) 345 can be indicative of one or more vehicle constraints associated with an autonomous vehicle 345. For example, the one or more vehicle constraints can be indicative of at least one of one or more time constraints (e.g., that are indicative of a time at which the vehicle will go offline with the service entity), one or more preferred destinations of the autonomous vehicle 345 (e.g., where the vehicle would like to be located when it goes offline, near a service depot, etc.), one or more restrictions related to vehicle services (e.g., the vehicle only performs delivery services, only performs user transportation services, etc.), vehicle capacity (e.g., number of seats, trunk space, etc.), pre-determined routes traveled by the autonomous vehicle (e.g., city loops), maintenance schedules, and/or other information. In some implementations, the data 360 can include data (e.g., communicated from an autonomous vehicle 345) that indicates requests that the associated vehicle be re-positioned, as further described herein. The operations computing system 300 can utilize the data 360 to identify autonomous vehicle(s) 345 that are in an idle state (or may become so after the completion of a current vehicle service assignment) and/or that can be re-positioned to help avoid wasting the vehicle's computational resources (e.g., while in an idle state).

To help determine where an autonomous vehicle 345 may be re-positioned, the operations computing system 300 can obtain data indicative of a geographic area with a vehicle imbalance. A vehicle imbalance can be an imbalance in a number of vehicles associated with the geographic area. Vehicles associated with a geographic area can be vehicles that are located within the geographic area and/or are available to perform vehicle service(s) of the service entity that begin, traverse, and/or end within the geographic area. In some implementations, this can include autonomous vehicles and non-autonomous vehicles. In some implementations, the vehicle imbalance can be an autonomous vehicle imbalance. This can include an imbalance in a number of autonomous vehicles associated with the geographic area (e.g., autonomous vehicles that are located within the geographic area and/or are available to perform vehicle service(s) of the service entity that begin, traverse, and/or end within the geographic area, etc.).

Figure 4:
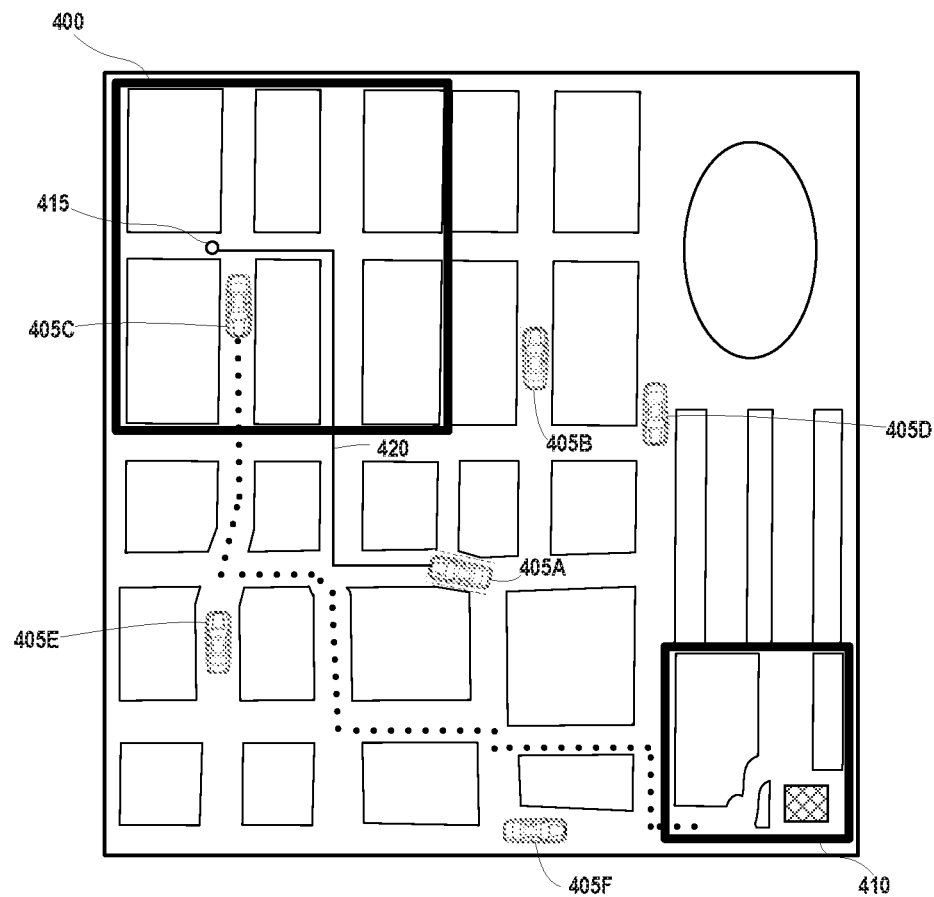
FIG. 4 depicts an example geographic area according to example embodiments of the present disclosure.

The imbalance can include a surplus or a deficit in the number of non-autonomous vehicles and/or autonomous vehicles 345 as compared to a demand for the one or more vehicles services. In some implementations, the imbalance can be indicative of a projected imbalance in the number of non-autonomous vehicles and/or autonomous vehicles associated with the geographic area at a future timeframe. Imbalanced geographic areas represent opportunities of where the supply of autonomous vehicles 345 can be adjusted to increase the opportunity for an autonomous vehicle to receive vehicle service assignments/perform vehicle services (e.g., reduced idle time). These can be geographic areas associated with the service entity (e.g., area(s) in which the service entity offers vehicle service(s), area(s) in which previous vehicle service assignments have been completed, area(s) in which future vehicle service requests are predicted, etc.). For example, FIG. 4 depicts an example geographic area 400 according to example embodiments of the present disclosure. The geographic area 400 can have a vehicle imbalance (e.g., an imbalance in the number of non-autonomous vehicles and/or autonomous vehicles associated with the geographic area 400).

Again with reference to FIG. 3, in some implementations, to identify that the geographic area 400 is associated with a vehicle imbalance, the operations computing system 300 can obtain data 365 associated with the geographic area 400. This data can provide a variety of information about the geographic area 400. For example, the data 365 associated with a geographic area 400 can be indicative of the past, present, and/or future (e.g., known and/or predicted):

demand for vehicle services associated with the geographic area 400 (e.g., the number of service requests that begin, end, and/or involve the traversal of the geographic area, etc.), a supply of vehicles associated the geographic area 400 (e.g., the number of non-autonomous vehicles and/or autonomous vehicles, etc.), events associated with the geographic area 400 (e.g., concerts, sporting events, performances, etc.), weather conditions associated with the geographic area 400 (e.g., rain, snow, high/low temperatures, etc.), and/or other information. The operations computing system 300 can obtain location data (e.g., GPS data) and/or motion planning data associated with the vehicles associated with the geographic area 400 to determine the supply of vehicles associated with the geographic area 400. In some implementations, the data 365 can be acquired via one or more autonomous vehicles 345 (e.g., the sensors associated therewith). For example, autonomous vehicles 345 can obtain data indicative of current conditions (e.g., traffic conditions, weather conditions, etc.) associated with the geographic area 400.

In some implementations, the operations computing system 300 can utilize past and/or current data to project future parameters associated with the geographic area 400. For example, the operations computing system 300 can predict a future demand for vehicle services within the geographic area 400 based at least in part on a past and/or current demand for vehicle services. Such prediction can be made for like circumstances (e.g., similar time of day, season, occurrence, weather, etc.). In this way, the operations computing system 300 may be able to predict the occurrence of a vehicle imbalance at a future timeframe.

For instance, the operations computing system 300 can determine that a geographic area 400 has an imbalance in the number of vehicles associated with the geographic area 500 based at least in part on the data 365 associated with the geographic area 400. By way of example, the operations computing system 300 can determine that there should be an increase in the number of autonomous vehicles 345 within the geographic area 400 in the event that the current and/or future demand for vehicle service(s) outweighs the current and/or future supply of non-autonomous vehicles and/or autonomous vehicles within the geographic area 400 (e.g., a deficit). This can be calculated for a particular time frame (e.g., current, future timeframe). In another example, the operations computing system 300 can determine that there should be a decrease in the number of autonomous vehicles 345 within the geographic area 400 in the event that the current and/or future demand for vehicle service(s) is outweighed by the current and/or future supply of non-autonomous vehicles and/or autonomous vehicles within the geographic area 400 (e.g., a surplus). This can be calculated for a particular time frame (e.g., current, future timeframe). In some implementations, another computing system can determine that the geographic area 400 has a vehicle imbalance and communicate such information to the operations computing system 300.

The operations computing system 300 can determine one or more autonomous vehicles 345 for re-positioning with respect to the geographic area 400. As described herein, the one or more autonomous vehicles 345 (for re-positioning) can be online with a service entity and in an idle state. The service entity can be associated with the provision of one or more vehicle services within the geographic area 400. In some implementations, the determination as to which autonomous vehicles to re-position can be made based at least in part on heuristics. For example, the operations computing system 300 can store one or more rules-based algorithms that are designed to identify the optimal candidate vehicles to be re-positioned based at least in part on the data 360 associated with autonomous vehicle(s) and the data 365 associated with the geographic area 400. These rules can identify, for example, autonomous vehicles 345 that are in an idle state and closest to the geographic area 400 as candidate vehicle(s) to be re-positioned with respect to the geographic area 400.

Additionally, or alternatively, the determination as to which autonomous vehicles 345 to re-position can be made based at least in part on one or more machine-learned models. For example, the machine-learned models can include neural networks (e.g., deep neural networks), and/or other multi-layer non-linear models. Neural networks can include feed-forward neural networks (e.g., convolutional neural networks), recurrent neural networks (e.g., long short-term memory recurrent neural networks), and/or other forms of neural networks. The machine-learned model(s) can be trained to recommend autonomous vehicles for re-positioning to a geographic area. For example, the machine-learned models can be trained based at least in part on a set of labelled training data that includes labels indicating which autonomous vehicles would be most appropriate for re-positioning with respect to a geographic area. In some implementations, the training data can be based at least in part on real-world data associated with autonomous vehicle(s) and/or geographic area(s).

The operations computing system 300 can determine an autonomous vehicle for re-positioning to (or away from) the geographic area based at least in part on the data 360 associated with the autonomous vehicle(s) 345 and/or the data 365 indicative of the geographic area 400. For instance, the operations computing system 300 can utilize the data 365 indicative of a geographic area 400 to determine when (e.g., within a current timeframe and/or within a future timeframe) and what type of vehicle supply adjustment is needed for the geographic area 400 (e.g., an increase in the number of autonomous vehicles, a decrease in the number of autonomous vehicles, etc.).

The operations computing system 300 can utilize the data 360 associated with the autonomous vehicle(s) to help select which the autonomous vehicle(s) 345 should be re-positioned to implement this vehicle supply adjustment. For example, the operations computing system 300 can analyze the state of the autonomous vehicles 345 to determine which autonomous vehicles 345 are idle and select one or more of the idle vehicles for re-positioning. In another example, the operations computing system 300 can use location data associated with the autonomous vehicle(s) 345 to determine which of the autonomous vehicles 345 are closest to the geographic area 400, within a threshold distance of the geographic area 400, etc. and select those vehicles to travel to the geographic area 400 to increase the number of available autonomous vehicles within the geographic area 400 (e.g., to address a deficit).

By way of example, FIG. 4 depicts a plurality of autonomous vehicles 405A-F that are online with the service entity associated with the operations computing system 300. The autonomous vehicles 340 of FIG. 3 can be or otherwise include the autonomous vehicles 405A-F. The operations computing system 300 can determine a first autonomous vehicle 405A for re-positioning to the geographic area 400 based at least in part on data associated with the first autonomous vehicle 405A and data indicating that the geographic area 400 has a vehicle imbalance. This can include an imbalance in the number of non-autonomous and/or autonomous vehicles associated with the geographic area 400. The first autonomous vehicle 405A can be online with the service entity associated with the operations computing system 300 and in an idle state. Moreover, the first autonomous vehicle 405A can be geographically proximate to the geographic area 400.

In some implementations, the operations computing system 300 can select more than one autonomous vehicle for re-positioning with respect to the geographic area 400. For instance, the operations computing system 300 can determine a second autonomous vehicle 405B for re-positioning with respect to the geographic area 400 based at least in part on the data 360 associated with the one or more autonomous vehicles and the data 365 indicative of the geographic area 400. The second autonomous vehicle 405B can also be in or predicted to enter into an idle state (e.g., after addressing a current vehicle service assignment, etc.). Moreover, the first autonomous vehicle 405A and the second autonomous vehicle 405B can be associated with different vehicle providers. For example, the first autonomous vehicle 405A can be associated with a first vehicle provider and the second autonomous vehicle 405B can be associated with a second vehicle provider that is different than the first vehicle provider. In this way, the operations computing system 300 can select autonomous vehicles associated with different vehicle providers for re-positioning with respect to the geographic area 400.

In another example, in the event that the geographic area 400 has a vehicle imbalance that includes a vehicle surplus, the operations computing system 300 can determine autonomous vehicle(s) for re-positioning away from the geographic area 400. For instance, the operations computing system 300 can identify one or more autonomous vehicles that are currently located within the geographic area 400. The operations computing system 300 can identify autonomous vehicle(s) that are currently located within the geographic area 400 based at least in part on location data indicative of the vehicles' current position. The operations computing system 300 can select those vehicles to travel away from the geographic area 400 to another geographic area 410 (e.g., to address a surplus with the other geographic area 410). By way of example, the operations computing system 300 can determine a third autonomous vehicle 405C (e.g., that is within the geographic area 400) to be re-positioned away from the geographic area 400.

In some implementations, the operations computing system 300 may choose to re-position an autonomous vehicle based on whether or not the vehicle is included in the service entity's dedicated supply. The operations computing system 300 can obtain data 360 that is indicative of whether an autonomous vehicle is included in the service entity's dedicated supply or non-dedicated supply. The operations computing system 300 can determine one or more autonomous vehicles for re-positioning based at least in part on the data 360 that is indicative of whether the autonomous vehicle(s) are included in the service entity's dedicated supply or non-dedicated supply. For example, the first autonomous vehicle 405A and the second autonomous vehicle 405B may be included in the service entity's dedicated supply. A fourth autonomous vehicle 405D may be included in the service entity's non-dedicated supply. For example, the fourth autonomous vehicle 405D can be concurrently online with two different service entities. The operations computing system 300 can select the first autonomous vehicle 405A and the second autonomous vehicle 405B for re-positioning with respect to the geographic area 400 (e.g., since these vehicles are more likely to comply). The operations computing system 300 can select the fourth autonomous vehicle 405D for re-positioning, for example, in the event that the first autonomous vehicle 405A and the second autonomous vehicle 405B are incapable of being re-positioned to the geographic area 400.

In some implementations, the operations computing system 300 can choose autonomous vehicle(s) that travel along a pre-determined route that includes and/or is proximate to the geographic area 400. For example, the first autonomous vehicle 405A may generally follow a pre-determined route (e.g., a city loop, etc.) that traverses at least a portion of and/or gets at least close to the geographic area 400. Accordingly, the operations computing system 300 can determine that the first autonomous vehicle 405A would be a good candidate for re-positioning with respect to the geographic area 400.

In some implementations, the operations computing system 300 can identify autonomous vehicle(s) for re-positioning based at least in part on one or more vehicle constraint(s). For example, the operations computing system 300 can evaluate the time constraint(s) associated with the autonomous vehicle(s) to determine which autonomous vehicle(s) have sufficient time to travel to a geographic area. For example, with reference to FIG. 4, the operations computing system 300 may not select a fifth vehicle autonomous vehicle 405E to re-locate to the geographic area 400 in the event that the fifth vehicle autonomous vehicle 405E will only be online with the service entity for five more minutes. Additionally, or alternatively, the operations computing system 300 can determine which autonomous vehicles will still be online and available for a re-positioning at future timeframe (e.g., to increase/decrease the number of vehicles in the geographic area 400 at the future timeframe).

In some implementations, the operations computing system 300 can consider an autonomous vehicle's preferred destination when identifying vehicles for re-positioning. For example, the operations computing system 300 can determine that the second autonomous vehicle 405B has scheduled maintenance and that the second autonomous vehicle 405B would prefer to go offline at a location that is near a service depot. As such, the operations computing system 300 can select the second autonomous vehicle 405B to be re-positioned to the geographic area 400 in the event that the service depot is located proximate to the geographic area 400. This can help the second autonomous vehicle 405B to efficiently utilize its onboard computing resources.

In some implementations, the operations computing system 300 may select at least a subset of a vehicle provider's fleet to be re-positioned with respect to the geographic area 400. For example, the operations computing system 300 can determine that a vehicle provider is associated with a plurality of autonomous vehicles that are online with the service entity and are in an idle state. The operations computing system 300 can identify each of the vehicles in that plurality of autonomous vehicles as potential candidates to be re-positioned with respect to the geographic area 400. In some implementations, the operations computing system 300 may not specifically determine which of the autonomous vehicles are to be re-positioned with respect to the geographic area 400. Rather, the operations computing system 300 can allow the vehicle provider to determine which of the autonomous vehicles in its online fleet are to be re-positioned, as further described herein. This can give the vehicle provider the flexibility to determine which vehicle(s) it prefers to be re-located.

In some implementations, the operations computing system 300 can utilize a more global type of analysis when determining which autonomous vehicles 405A-F should be re-positioned. For instance, the operations computing system 300 can utilize a cost analysis, machine-learned model, optimization heuristics, etc. to determine what effects the re-positioning of certain autonomous vehicles may have on each of the other autonomous vehicles that are online with the service entity. The operations computing system 300 can determine how re-positioning some autonomous vehicles with respect to the geographic area 400 may affect the number of vehicle service assignments given to another autonomous vehicle as well as the potential increase in idle time for that other autonomous vehicle. The operations computing system 300 can perform a cost analysis to determine the least costly approach across all of the autonomous vehicles 405A-F that are online with the service entity (e.g., the re-positioning determination that leads to the lowest amount of vehicle idle time).

Returning to FIG. 3, the operations computing system 300 can communicate data indicative of one or more re-positioning assignments 370 associated with the one or more autonomous vehicles 345 determined for re-positioning with respect to the geographic area 400. The one or more re-positioning assignments 370 can be indicative of the geographic area 400. For example, the re-positioning assignment can include a location identifier 415 (e.g. shown in FIG. 4) associated with the geographic area 400 (e.g., a set of latitude/longitude coordinates, an area, an address, boundaries, etc.). A re-positioning assignment 370 can indicate that an autonomous vehicle 345 is to be re-positioned with respect to the geographic area 400. For example, a re-positioning assignment 370 can indicate that an autonomous vehicle 345 is to travel to the geographic area 400. The re-positioning assignment 370 can indicate that an autonomous vehicle 345 is to arrive at, get as close as possible to, get within a distance of (e.g., a threshold distance of, a reasonable walking distance of, etc.), circle nearby, etc. the location identifier 415. In another example, a re-positioning assignment 370 can indicate that an autonomous vehicle 345 is to travel away from the geographic area 400. In some implementations, a re-positioning assignment 370 can indicate that an autonomous vehicle 345 is to travel until the vehicle is outside of the geographic area 400. In some implementations, the re-positioning assignment 370 can indicate the location identifier of another geographic area 410 to which an autonomous vehicle 345 is to travel (e.g., when leaving the geographic area that needs to decrease its number of autonomous vehicles).

In some implementations, a re-positioning assignment(s) 370 can be indicative of a route and/or a task for an autonomous vehicle 345. For instance, with reference to FIG. 4, a re-positioning assignment 370 can be further indicative of a route 420 to the geographic area 400 for the first autonomous vehicle 405A. The route 420 can include a route that the operations computing system 300 (and/or another system) has determined will allow the first autonomous vehicle 405A to utilize the least amount of its onboard computational resources while traveling to the geographic area 400, a route with the fastest time to the geographic area 400, a route with the shortest distance to the geographic area 400, a route with the most familiar travel ways, etc. In some implementations, the re-positioning assignment 370 can be indicative of a task for an autonomous vehicle to perform while travelling in accordance with the route 420 to the geographic area 400. For example, the re-positioning assignment 370 can specify that the first autonomous vehicle 405A is to acquire sensor data of a particular travel way that has experienced a change in conditions (e.g., new bridge, new sidewalks, added travel lane(s), etc.), is to attempt to break-up a traffic snake, etc.

Returning to FIG. 3, the re-positioning assignment(s) 370 can command or request that an autonomous vehicle 345 be re-positioned. For instance, a re-positioning assignment 370 can be formulated as a command for an autonomous vehicle 345 to be re-positioned with respect to the geographic area 400. The command may not be rejected. The operations computing system 300 can utilize such commands for the autonomous vehicle(s) 345 that are included in the dedicated supply of the service entity (e.g., the autonomous vehicle(s) that will not reject the re-positioning assignment unless physically impaired from compiling). In some implementations, a re-positioning assignment 370 can be formulated as a request for an autonomous vehicle 345 to be re-positioned with respect to the geographic area 400. The request may be accepted or rejected. The operations computing system 300 can utilize such requests for the autonomous vehicle(s) 345 that are included in the non-dedicated supply of the service entity (e.g., the vehicle(s) that have the ability to accept or reject the re-positioning assignment).

In some implementations, a re-positioning assignment 370 can include a vehicle service incentive 375 to help entice an acceptance of the re-positioning assignment 370. The vehicle service incentive 375 can include, for example, an increase in the compensation for the autonomous vehicles' next vehicle service assignment(s), increased rating, priority treatment for vehicle service assignment(s), etc. In some implementations, the operations computing system 300 can include data indicative of such an incentive in a vehicle service assignment 300 to entice an autonomous vehicle 345 (and/or vehicle provider) to accept the request for the autonomous vehicle 345 to be re-positioned with respect to the geographic area 400.

The re-positioning assignment(s) 370 can be communicated directly or indirectly to the autonomous vehicle(s) 345. For example, the operations computing system 300 can communicate data indicative of a re-positioning assignment 370 directly to an autonomous vehicle 345 (e.g., to the vehicle computing system 340) that is online with the service entity (e.g., via the service entity's platform/network, etc.). Additionally, or alternatively, data indicative of the re-positioning assignment(s) 370 can be communicated to a vehicle provider associated with the autonomous vehicle(s) 345. For example, as described herein, the operations computing system 300 can determine that a plurality of autonomous vehicles 345 are candidates for re-positioning and that any of these autonomous vehicles may be similarly appropriate for re-positioning with respect to the geographic area 400. The operations computing system 300 can communicate data indicative of the re-positioning assignment(s) 370 to a computing system associated with the vehicle provider (e.g., a vehicle provider computing system 350). The vehicle provider computing system 350 can in turn select which of the autonomous vehicle(s) 345 (e.g., in the vehicle provider's fleet, etc.) are to be re-positioned and communicate with those vehicle(s) accordingly, as further described herein.

In some implementations, a re-positioning assignment can be overridden by a vehicle service assignment 330. For example, with reference to FIG. 4, a first autonomous vehicle 405A can be in an idle state and can obtain data indicative of a re-positioning assignment 370 and begin to travel to a geographic area 400, as instructed. While en route to the geographic area 400, the first autonomous vehicle 405A may obtain a vehicle service assignment 330. As such, the first autonomous vehicle 405A can accept and address the vehicle service assignment 330 (e.g., travel to pick-up a user, etc.), before completing the re-positioning assignment 370.

In another example, the operations computing system 300 can communicate a re-positioning assignment 370 to an autonomous vehicle that is currently addressing a vehicle service assignment 330 associated with the service entity. For example, a sixth autonomous vehicle 405F can be travelling to pick-up a user/item, transporting the user/item, etc. The operations computing system 300 can determine that the sixth autonomous vehicle 405F may enter into an idle state after completion of that vehicle service assignment 330. The operations computing system 300 can communicate data indicative of a re-positioning assignment 370 for the sixth autonomous vehicle 405F to undertake after completing the vehicle service assignment 330. In this way, the operations computing system 300 can forward deploy the re-positioning assignment 370 so that the sixth autonomous vehicle 405F will perform the re-positioning assignment 330, to help decrease idle time. In the event that the sixth autonomous vehicle 405F obtains a subsequent vehicle service assignment, the sixth autonomous vehicle 405F can accept that vehicle service assignment before addressing the re-positioning assignment 370.

Returning to FIG. 3, in some implementations, the operations computing system 300 can confirm that an autonomous vehicle 345 has undertaken a re-positioning assignment 370. In some implementations, the operations computing system 300 can obtain (e.g., via a vehicle computing system 100, via a vehicle provider computing system 350, etc.) data indicative of an acceptance of the re-positioning assignment 370. Such data can include a communication that is formulated (e.g., by a vehicle computing system 100, by a vehicle provider computing system 350, etc.) based at least in part on an API associated with the service entity. Additionally, or alternatively, the operations computing system 300 can determine whether an autonomous vehicle 345 is re-positioning itself (e.g., autonomously re-positioning itself, etc.) with respect the geographic area 400. For example, the operations computing system 300 can obtain data indicative of a motion plan of an autonomous vehicle 345. The operations computing system 300 can confirm that the autonomous vehicle 345 is travelling to (or away from) the geographic area 400 based at least in part on the data indicative of the motion plan of the autonomous vehicle 345. Additionally, or alternatively, the operations computing system 300 can obtain location data (e.g., GPS data, etc.) associated with an autonomous vehicle 345. The operations computing system 300 can determine whether an autonomous vehicle 345 has re-positioned to (e.g., travelled to, arrived at, etc.) the geographic area 400 (e.g., travelled to, arrived at, etc. the geographic area 400) based at least in part on the location data associated with the autonomous vehicle 345. In this way, the operations computing system 300 can determine whether an autonomous vehicle 345 has already and/or intends to travel to (or travel away from) a geographic area as instructed.

The operations computing system 300 can communicate data indicative of a vehicle service assignment 330 associated with the geographic area 400 to an autonomous vehicle 345. The operations computing system 300 can do so, for example, after confirming that the autonomous vehicle 345 is being and/or has been re-positioned to the geographic area 400. By of example, with reference to FIG. 4, the operations computing system 300 can confirm that the first autonomous vehicle 405A is travelling to the geographic area 400 in accordance with a re-positioning assignment 370. The operations computing system 300 can obtaining data indicative of a vehicle service request 325 associated with the geographic area 400 for one or more of the vehicle services of the service entity. This can include, for example, a transportation service that has a destination location within the geographic area 400, a transportation service that has an origin location within the geographic area 400, etc. The operations computing system 300 can generate data indicative of a vehicle service assignment 330 based at least in part on the data indicative of the vehicle service request 325. The operations computing system 300 can communicate (e.g., directly or indirectly) the data indicative of the vehicle service assignment 330 associated with the geographic area 400 to the first autonomous vehicle 405A. In this way, the operations computing system 300 can decrease the idle time of the first autonomous vehicle 405A by providing a vehicle service assignment 330 associated with the imbalanced geographic area 400 to the first autonomous vehicle 405A.

Returning to FIG. 3, in some implementations, an autonomous vehicle 345 and/or a vehicle provider can indicate to a service entity that an autonomous vehicle 345 may be re-positioned. For example, a vehicle computing system 340 of an autonomous vehicle 345 and/or a vehicle provider computing system 320 of a vehicle provider associated with the autonomous vehicle 345 can determine that the autonomous vehicle 345 has and/or will enter into an idle state. The autonomous vehicle 345 and/or the vehicle provider computing system 350 can communicate data, to the operations computing system 300, indicating that the autonomous vehicle 345 is available for re-positioning and/or requesting a re-positioning assignment 370. Such data can be included in the data 360 associated with the autonomous vehicle 345 that is considered by the operations computing system 300 when determining autonomous vehicle(s) for re-positioning. For instance, the data 360 associated with an autonomous vehicle 345 can be indicative of a request for the autonomous vehicle 345 to be re-positioned. The operations computing system 300 can determine an autonomous vehicle 345 for re-positioning based at least in part on the request for that autonomous vehicle 345 to be re-positioned.

In some implementations, the operations computing system 300 can incentivize a vehicle provider to re-position at least a portion of its vehicle fleet to an imbalanced geographic area. For instance, the operations computing system 300 can obtain data indicative of a geographic area 500 (shown in FIG. 5) with a vehicle imbalance (e.g., an imbalance in a number of non-autonomous vehicles and/or autonomous vehicles associated with the geographic area), as described herein. The operations computing system 300 can generate a vehicle service incentive 375 associated with the geographic area 500 that has the vehicle imbalance. A vehicle service incentive 375 can be an enticement to a vehicle provider to re-position one or more of its associated autonomous vehicles 345 with respect to the geographic area 500 (e.g., to travel to the geographic area, to travel away from the geographic area, etc.). In this way, rather than selecting autonomous vehicles for re-positioning with respect to the imbalanced geographic area 500, the operations computing system 300 can generate a vehicle service incentive 375 that may entice a vehicle provider to do so.

In some implementations, the vehicle service incentive 375 can be a financial incentive associated with the geographic area 500 that has the vehicle imbalance. By way of example, the vehicle service incentive 375 can include a payment to the vehicle provider (and/or an autonomous vehicle) for re-positioning an autonomous vehicle 345 with respect to the geographic area 500. Additionally, or alternatively, a vehicle service incentive 375 can include an increase in the compensation parameter associated with a requested vehicle service. For example, an autonomous vehicle 345 (and/or a vehicle provider associated therewith) can receive an increased payment for the transportation of a user from one location within the geographic area 500 to another (e.g., receive a greater amount of money than would normally be paid in circumstances where there is not a vehicle imbalance).

In some implementations, a vehicle service incentive 375 can include other types of incentives. For instance, a vehicle service incentive 375 can include an increase in a rating parameter associated with the autonomous vehicle 345 (e.g., that is to be re-positioned) and/or the vehicle provider. By way of example, the service entity can maintain a profile associated with a particular autonomous vehicle 345 and/or a profile associated with a particular vehicle provider. A profile can include a rating parameter that is reflective of how well (or poorly) the autonomous vehicle 345 has performed vehicle services and/or how well (or poorly) the vehicle provider's fleet has performed vehicle services. This can be a reflection of how satisfied users are with the autonomous vehicle 345 (and/or its associated vehicle provider), how satisfied a service entity is with the autonomous vehicle 345 (and/or its associated vehicle provider), etc. In some implementations, such a rating can be increased when an autonomous vehicle 345 is re-positioned with respect to a geographic area with a vehicle imbalance and/or when an autonomous vehicle 345 accepts a vehicle service assignment associated with the geographic area (e.g., when it has the autonomous vehicle imbalance).

In some implementations, the vehicle service incentive 375 can be associated with a predetermined time period. For example, the vehicle service incentive 375 can include an increased compensation parameter for a set portion of a day, week, etc. Additionally, or alternatively, the vehicle service incentive 375 can be associated with a future time frame when the autonomous vehicle imbalance is expected to occur (e.g., during a sporting event, concert, and/or other event within the geographic area, etc.).

The operations computing system 300 can communicate data indicative of the vehicle service incentive 375 associated with the geographic area 500 (that has the vehicle imbalance) to one or a plurality of other computing systems. For example, the operations computing system 300 can communicate the data indicative of the vehicle service incentive 375 to a plurality of vehicle provider computing systems 350 of a plurality of different vehicle providers. Each different vehicle provider computing system 350 can be associated with a different vehicle provider. Each different vehicle provider can be associated with one or more different autonomous vehicles (e.g., one or more autonomous vehicles in the vehicle provider's own fleet).

A vehicle provider computing system 350 can be configured to select at least one autonomous vehicle 345 for re-positioning with respect to the geographic area 500 that has the vehicle imbalance. For instance, a first vehicle provider computing system associated with a first vehicle provider can determine which of the autonomous vehicle(s) in the first vehicle provider's fleet are to be re-positioned (if any) with respect to the geographic area 500. The first vehicle provider computing system can select, for example, autonomous vehicle(s) that are online with the service entity associated with the vehicle service incentive 375, autonomous vehicle(s) that are in an idle state, autonomous vehicle(s) that are closest to the geographic area 500, etc. By way of example, with reference to FIG. 5, a first vehicle provider can determine that a first autonomous vehicle 505A for re-positioning with respect to the geographic area 500 that has the vehicle imbalance (e.g., to travel to the geographic area 500 to help with a vehicle deficit). The first vehicle provider computing system can communicate data indicative of a re-positioning assignment and/or other data to cause the first autonomous vehicle 505A to re-position itself with respect to the geographic area 500. For example, the first vehicle provider computing system can communicate data to the first autonomous vehicle 505A indicating that the first autonomous vehicle 505A is to re-position with respect to the geographic area 500. The vehicle computing system of the first autonomous vehicle 505A can obtain such data and cause the first autonomous vehicle 505A to initiate a motion control to re-position the vehicle with respect to the geographic area 500. This can, for example, cause the first autonomous vehicle 505A to autonomously travel to the geographic area 500.

In some implementations, more than one vehicle provider can re-position its autonomous vehicles with respect to the geographic area 500. For example, a second vehicle provider computing system associated with a second vehicle provider (e.g., that is different than the first vehicle provider) can select a second autonomous vehicle 505B for re-positioning with respect to the geographic area. In this way, the service entity can leverage several different vehicle providers to re-position autonomous vehicles (e.g., of different fleets) so as to increase the likelihood that the imbalance will be addressed. The first and second autonomous vehicles 505A-B can be or other included in the autonomous vehicle(s) 345 of FIG. 3.

The operations computing system 300 can confirm that an autonomous vehicle is being or has been re-positioned with respect to the geographic area 500. For instance, the operations computing system 300 can confirm that a first autonomous vehicle 505A associated with a first vehicle provider is being or has been re-positioned with respect to the geographic area 500. Additionally, or alternatively, the operations computing system 300 can confirm that a second autonomous vehicle 505B associated with a second vehicle provider is being or has been re-positioned with respect to the geographic area 500 (e.g., the second vehicle provider being different from the first vehicle provider). In some implementations, to perform such confirmation, the operations computing system 300 can obtain data indicative of a motion plan of the first autonomous vehicle 505A, as similarly described herein. The operations computing system 300 can determine that the first autonomous vehicle 505A is being or has been re-positioned with respect to the geographic area 500 based at least in part on the data indicative of the motion plan of the first autonomous vehicle 505A. Additionally, or alternatively, operations computing system 300 can obtain location data associated with the first autonomous vehicle 505A. The operations computing system 300 can determine that the first autonomous vehicle 505A is being or has been re-positioned with respect to the geographic area 500 based at least in part on the location data. A similar such approach can be taken to confirm the re-positioning of the second autonomous vehicle 505B.

With reference to FIG. 3, in some implementations, a vehicle provider computing system 350 and/or an autonomous vehicle 345 can communicate, to the operations computing system 300 (e.g., via an API of the service entity), data 380 indicating that the autonomous vehicle 345 is being or has been re-positioned with respect to an imbalanced geographic area 500. The operations computing system 300 can determine that an autonomous vehicle 345 is being or has been re-positioned with respect to the geographic area 500 based at least in part on this data 380.

In some implementations, a service entity can cancel a vehicle service incentive 375. For instance, the operations computing system can determine a number of autonomous vehicles 345 that are needed for re-positioning with respect to the geographic area 500 based at least in part on the vehicle imbalance. That number can include, for example, a certain number of autonomous vehicles that need to be added to a geographic area 500 to address a deficit in the number of vehicles within the geographic area 500 or a certain number of autonomous vehicles that need to be removed from the geographic area 500 to address a surplus in the number of vehicles within the geographic area 500. The operations computing system 300 can confirm that a plurality of autonomous vehicles, which includes at least the number of autonomous vehicles needed for re-positioning with respect to the geographic area 500, are being or have been re-positioned with respect to the geographic area 500. This can include autonomous vehicles from multiple different vehicle providers. For example, with reference to FIG. 5, a first autonomous vehicle 505A (e.g., of the plurality of autonomous vehicles needed for re-positioning) can be associated with a first vehicle provider and a second autonomous vehicle 505B (e.g., of the plurality of autonomous vehicles needed for re-positioning) can be associated with a second vehicle provider, that is different than the first vehicle provider.

In some implementations, the operations computing system 300 can cancel the vehicle service incentive 375 based at least in part on the confirmation that the necessary number of autonomous vehicles are being or have been re-positioned with respect to the geographic area 500 that has the vehicle imbalance. For instance, the operations computing system 300 can indicate that the vehicle service incentive 375 associated with the geographic area 500 (e.g., an increase level of compensation for vehicle services, etc.) is unavailable to the vehicle providers other than the those that have re-positioned autonomous vehicles (e.g., vehicle providers other than the first vehicle provider associated with the first autonomous vehicle 505A and/or the second vehicle provider associated with the second autonomous vehicle 505B). The operations computing system 300 can communicate (e.g., to the other computing systems associated with the other vehicle providers that have not re-positioned autonomous vehicles) data indicating that the vehicles service incentive 375 associated with the geographic area is unavailable. For example, this can include an indication that the vehicle service incentive 375 is no longer available to that vehicle provider and/or the autonomous vehicle(s) associated with that vehicle provider.

In some implementations, the cancellation of a vehicle service incentive 375 may only be applicable to the vehicle providers that did not re-position any autonomous vehicles with respect to the geographic area 500. For example, the operations computing system 300 can communicate data indicating that the vehicle service incentive 375 is no longer available to autonomous vehicles (e.g., that are not being or have not been re-positioned with respect to the geographic area) and/or their associated vehicle providers. In some implementations, the vehicle service incentive 375 may remain available to one or more autonomous vehicles that were re-positioned with respect to the geographic area 500 (and/or the associated vehicle provider(s)) even after the cancellation. This can include, for example, autonomous vehicle(s) that were selected for re-positioning, being re-positioned, had been re-positioned, etc. with respect to the geographic area 500 prior to the cancellation of the vehicle service incentive 375. By way of example, with reference to FIG. 5, the vehicle service incentive 375 (e.g., an increased level of compensation) may remain available to the first autonomous vehicle 505A, the first vehicle provider, the second autonomous vehicle, and the second vehicle provider after the operations computing system 300 cancels the vehicle service incentive 375 for other vehicle providers.

The operations computing system 300 can cancel the vehicle service incentive for all vehicle providers and/or autonomous vehicle. This can be done, for example, after the vehicle imbalance of the geographic area 500 has been adequately addressed (e.g., there is no longer a vehicle deficit, vehicle surplus, etc.).

With reference to FIG. 3, an autonomous vehicle 345 that is being and/or has been re-positioned with respect to the geographic area 500 can obtain a vehicle service assignment 330 that is based at least in part on the vehicle service incentive 375. For instance, the operations computing system 300 can obtain data indicative of a vehicle service request 325 for a vehicle service associated with the geographic area 500. This can include, for example, a request for a user to be transported from an origin location positioned within the geographic area 500. The operations computing system 300 can generate data indicative of a vehicle service assignment 330 based at least in part on the vehicle service incentive 375 and the vehicle service request 325. For example, the operations computing system 300 can generate a vehicle service assignment 330 that indicates that the autonomous vehicle/vehicle provider will be given a higher level of compensation for the requested transportation service than would normally be provided for such a request. The operations computing system 300 can communicate data indicative of the vehicle service assignment 330 to an autonomous vehicle 345 (e.g., that was selected for re-positioning) and/or a vehicle provider computing system 350 associated with a vehicle provider.

Figure 5:
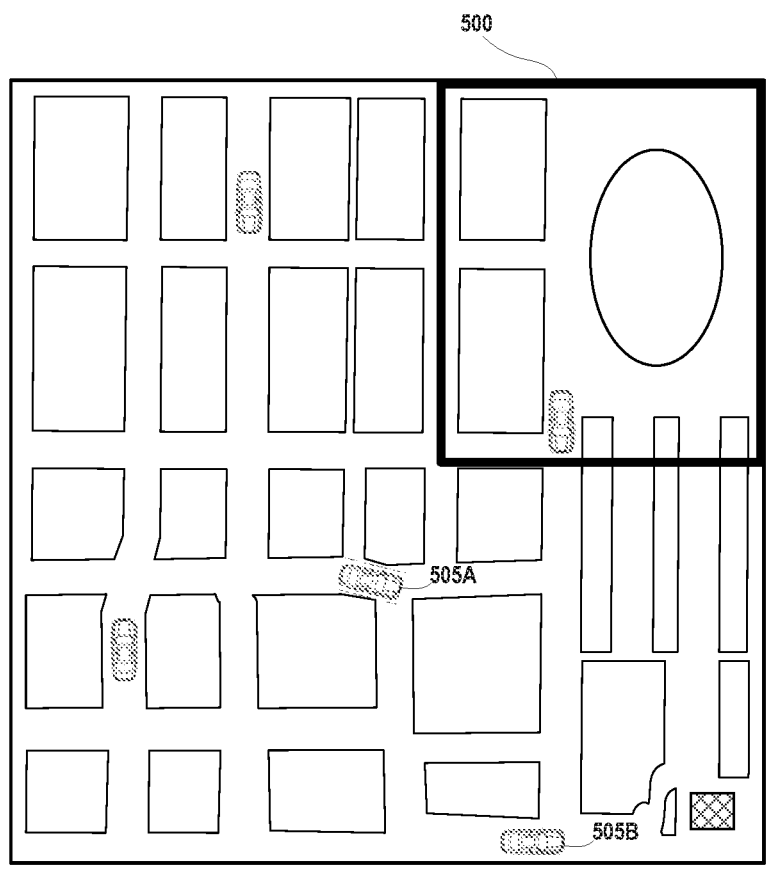
FIG. 5 depicts another example geographic area according to example embodiments of the present disclosure.

For example, with reference to FIG. 5, the operations computing system 300 can communicate data indicative of a first vehicle service assignment to the first autonomous vehicle 505A. The first vehicle service assignment can be based at least in part on the vehicle service incentive 375. The first vehicle service assignment can be indicative of a first requested vehicle service. The vehicle service incentive 375 can be an increase in a compensation parameter associated with a first requested vehicle service. Additionally, or alternatively, the operations computing system 300 can communicate data indicative of a second vehicle service assignment to the second autonomous vehicle 505B. The second vehicle service assignment can be based at least in part on the vehicle service incentive 375. The second vehicle service assignment can be indicative of a second requested vehicle service. The second vehicle service assignment can be indicative of an increased compensation, rating, etc. for performing the second requested vehicle service. The first and second autonomous vehicles 505A, 505B (and/or an associated vehicle provider computing system 350) can accept the vehicle service assignment 330 and perform (or cause the respective autonomous vehicle to perform) the requested vehicle services to receive the vehicle service incentive 375.

Figure 6:
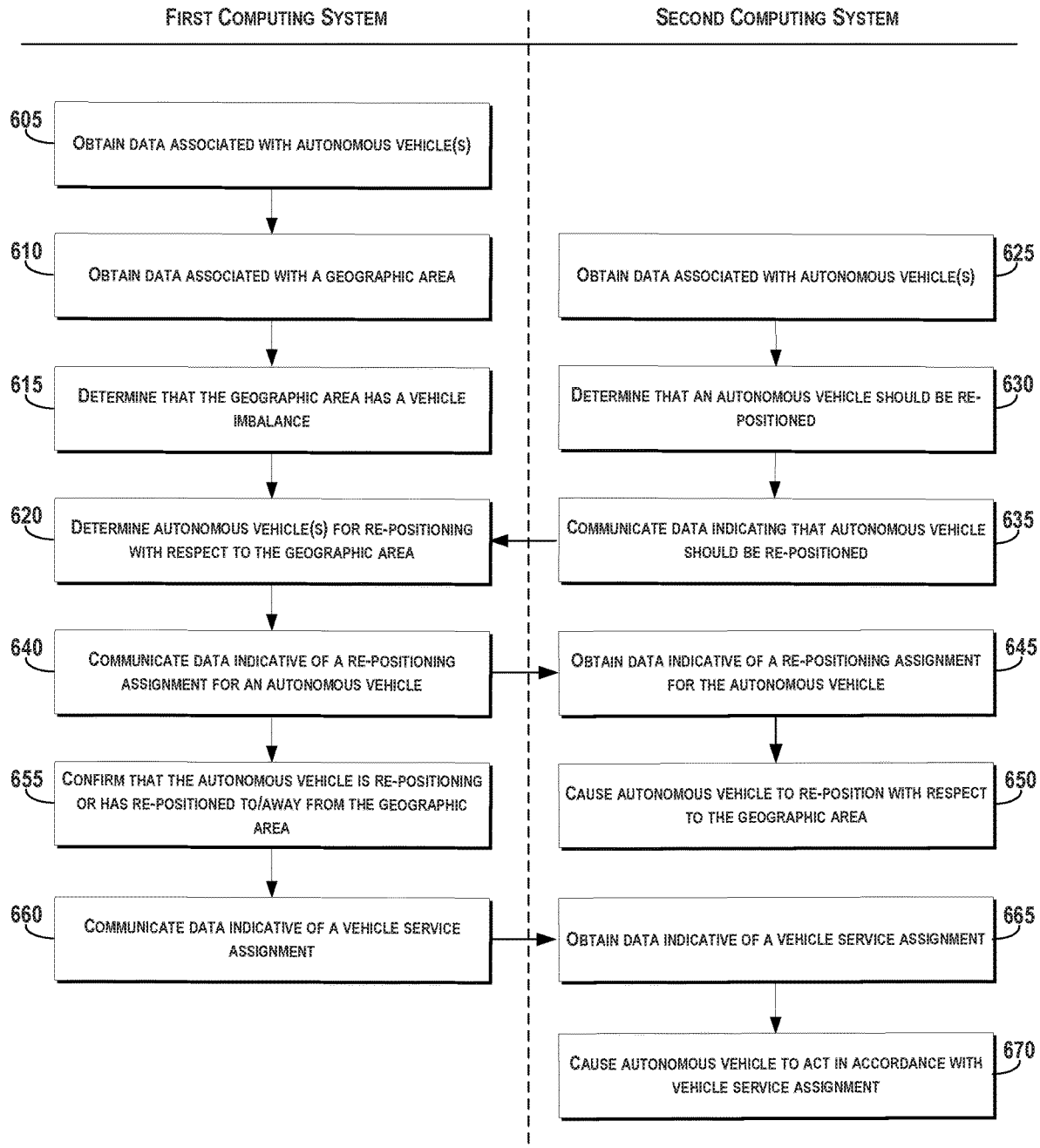
FIG. 6 depicts a flow diagram of an example method for controlling autonomous vehicles to reduce idle data usage and vehicle downtime according to example embodiments of the present disclosure.

FIG. 6 depicts a flow diagram of an example method for controlling/re-positioning autonomous vehicles to reduce idle data usage and vehicle downtime according to example embodiments of the present disclosure. One or more portion(s) of the method 600 can be implemented by a computing system that includes one or more computing devices such as, for example, the computing systems described with reference to the other figures (e.g., an operations computing system 225A-B, 300, a vehicle provider computing system 210, 350, a vehicle computing system 100, 340, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-3 and/or 8), for example, to control/re-position one or more autonomous vehicles. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method 600 can be performed additionally, or alternatively, by other systems.

At (605), the method 600 can include obtaining data associated with one or more autonomous vehicle(s). For instance, a first computing system can obtain data associated with one or more autonomous vehicles that are online with a service entity. The first computing system can be associated with the service entity (e.g., an operations computing system 300 of the service entity). As described herein, the data associated with the autonomous vehicle(s) can be indicative of a vehicle's: online/offline status, the vehicle's current and/or future planned location, a vehicle service state (e.g., idle, addressing a vehicle service assignment, etc.), and/or other information.

At (610) and (615), the first computing system (e.g., an operations computing system 300) can obtain data indicative of a geographic area with an imbalance in a number of vehicles (e.g., autonomous vehicles) associated with the geographic area. For instance, the first computing system can obtain data associated with the geographic area, at (625). The data associated with the geographic area can include at least one of data indicative of a demand for the one or more vehicle services associated with the geographic area, data indicative of the number of vehicles (e.g., non-autonomous and/or autonomous vehicles) within the geographic area, data indicative of an event associated with the geographic area, and/or data indicative of a weather condition associated with the geographic area. In some implementations, other types of information can be described by such data. The first computing system can determine that the geographic area has the imbalance in the number of vehicles associated with the geographic area based at least in part on the data associated with the geographic area, at (615). As described herein, the imbalance can include a surplus or a deficit in the number of vehicles (e.g., non-autonomous and/or autonomous vehicles) as compared to a demand for the one or more vehicles services. In some implementations, the imbalance can be indicative of a projected imbalance in the number of vehicles (e.g., non-autonomous and/or autonomous vehicles) associated with the geographic area at a future timeframe.

At (620), the method 600 can include determining one or more autonomous vehicles for re-positioning with respect to the geographic area. For instance, the first computing system (e.g., an operations computing system 300) can determine a first autonomous vehicle for re-positioning with respect to the geographic area based at least in part on the data associated with the one or more autonomous vehicles and the data indicative of the geographic area. The first autonomous vehicle can be in an idle state, as described herein. The first autonomous vehicle can be associated with a first vehicle provider. In some implementations, the first autonomous vehicle can be addressing a vehicle service assignment associated with the service entity, as described herein. The first computing system can determine that the first autonomous vehicle may enter into an idle state after addressing that vehicle service assignment.

In some implementations, the first computing system can determine a second autonomous vehicle for re-positioning with respect to the geographic area based at least in part on the data associated with the one or more autonomous vehicles and the data indicative of the geographic area. The second autonomous vehicle can be associated with a second vehicle provider that is different than the first vehicle provider associated with the first autonomous vehicle determined for re-positioning.

In some implementations, an autonomous vehicle and/or a vehicle provider can request that an autonomous vehicle be re-positioned by a service entity. For instance, at (625), a second computing system can obtain data associated with one or more autonomous vehicles. The second computing system can be associated with a vehicle provider (e.g., a vehicle provider computing system 350). The second computing system can obtain data associated with one or more autonomous vehicles associated with the vehicle provider (e.g., in the vehicle provider's fleet). Such data can be indicative of a vehicle's: online/offline status, the vehicle's current and/or future planned location, a vehicle service state (e.g., idle, addressing a vehicle service assignment, etc.), and/or other information. The second computing system can determine an autonomous vehicle for re-positioning based at least in part on the data associated with the autonomous vehicle(s), at (630). For instance, the second computing system can identify an autonomous vehicle that is online with the service entity and in an idle state as an autonomous vehicle that can be re-positioned to help reduce idle data, fuel, power, etc. usage and consumption. At (635), the second computing system can communicate data indicating that the autonomous vehicle should be re-positioned to the first computing system (e.g., an operations computing system 300). In some implementations, a vehicle computing system of an autonomous vehicle can communicate (e.g., directly or indirectly) data to the first computing system requesting that the autonomous vehicle be re-positioned (e.g., because the vehicle is in an idle state). The first computing system can determine one or more autonomous vehicles for re-positioning with respect to the geographic area (that has the vehicle imbalance) based at least in part on the data indicating that the autonomous vehicle should be or is requested to be re-positioned.

At (640), the method 600 can include communicating data indicative of a re-positioning assignment for an autonomous vehicle. For instance, the first computing system can generate data indicative of a first re-positioning assignment for the first autonomous vehicle that was selected for re-positioning with respect to the imbalanced geographic area. The first re-positioning assignment can be indicative of the re-positioning of the first autonomous vehicle with respect to the geographic area.

For example, the first re-positioning assignment can indicate that the first autonomous vehicle is to travel to the geographic area. The first re-positioning assignment can be indicative of a location identifier associated with the geographic area, a route, etc. for the autonomous vehicle to travel to and/or follow.

In some implementations, the first re-positioning assignment can indicate that the first autonomous vehicle is to travel away from the geographic area. The first re-positioning assignment can be indicative of a location identifier that is outside of the geographic area, a route, etc. for the autonomous vehicle to travel to and/or follow.

As described herein, in some implementations (e.g., for non-dedicated supply vehicles), the first re-positioning assignment can include a request for the first autonomous vehicle to be re-positioned with respect to the geographic area. The first re-positioning assignment can include an incentive associated with the re-positioning of the first autonomous vehicle. In some implementations (e.g., for dedicated supply vehicles), the first re-positioning assignment can include a command for the first autonomous vehicle to be re-positioned with respect to the geographic area. The first computing system can communicate data indicative of a first re-positioning assignment associated with the first autonomous vehicle.

A similar such approach can be utilized to generate a second vehicle service assignment for the second autonomous vehicle determined for re-positioning. The second re-positioning assignment can be indicative of the re-positioning of the second autonomous vehicle with respect to the geographic area. The first computing system can communicate data indicative of a second re-positioning assignment associated with the second autonomous vehicle.

At (645), the method 600 can include obtaining data indicative of a re-positioning assignment for an autonomous vehicle. For instance, the second computing system (e.g., a vehicle provider computing system 350) can obtain the data indicative of the re-positioning assignment for the first autonomous vehicle. The second computing system can cause the first autonomous vehicle to re-position with respect to the geographic area, at (650). This can include, for example, the second computing system communicating data indicative of the re-positioning assignment to the first autonomous vehicle. Additionally, or alternatively, the second computing system can communicate another set of data to the first autonomous vehicle indicating that the first autonomous vehicle is to travel to (or away from) the geographic area. In some implementations, the first computing system can communicate the data indicative of the re-positioning assignment to a vehicle computing system of the first autonomous vehicle. The vehicle computing system of the first autonomous vehicle can obtain the data indicative of the re-positioning assignment from the first computing system (e.g., an operations computing system 300). The vehicle computing system of the first autonomous vehicle can initiate a motion control in accordance with the re-positioning assignment. For instance, the vehicle controller can send one or more signals to the vehicle control systems to cause the autonomous vehicle to begin to travel toward (or away from) the imbalanced geographic area. A similar such approach can be implemented to cause the second autonomous vehicle to be re-positioned with respect to the geographic area.

At (655), the method 600 can include confirming that the autonomous vehicle is re-positioning or has re-positioned to/away from the geographic area. For instance, the first computing system can confirm at least one of, that the first autonomous vehicle is travelling to the geographic area based at least in part on data indicative of a motion plan of the first autonomous vehicle or that the first autonomous vehicle travelled to the geographic area based at least in part on location data associated with the first autonomous vehicle, as described herein. The first computing system can also determine that an autonomous vehicle is travelling away from and/or has travelled away from a geographic area based at least in part on motion planning data and/or location data. Additionally, or alternatively, the first computing system can confirm that the second autonomous vehicle is being and/or has been re-positioned with respect to the geographic area.

At (660), the method 600 can include communicating data indicative of a vehicle service assignment. The first computing system (e.g., an operations computing system 300) can communicate data indicative of a vehicle service assignment associated with the geographic area, as described herein. The vehicle service assignment can be for the first autonomous vehicle that is being or has been re-positioned to the geographic area with the vehicle imbalance. The first computing system can communicate data indicative of a vehicle service assignment to the second computing system (e.g., the vehicle provider computing system 350) and/or a vehicle computing system of the first autonomous vehicle.

At (665), the method 600 can include obtaining data indicative of a vehicle service assignment. For instance, the second computing system can obtain data indicative of the vehicle service assignment. In some implementations, the vehicle provider computing system can obtain the data indicative of the vehicle service assignment and communicate it (or a variation thereof) to an autonomous vehicle. In some implementations, the vehicle computing system of the first autonomous vehicle can obtain the data indicative of the vehicle service assignment from the first computing system (e.g., an operations computing system 300).

At (670), the method 600 can include causing the autonomous vehicle to act in accordance with the vehicle service assignment. For instance, the second computing system can cause the first autonomous vehicle to act in accordance with the vehicle service assignment. For example, the second computing system can provide data to the vehicle computing system indicating that the first autonomous vehicle is to perform the vehicle service(s) associated with the vehicle service assignment. The vehicle computing system can initiate a motion control in accordance with the vehicle service assignment, as described herein.

Figure 7:
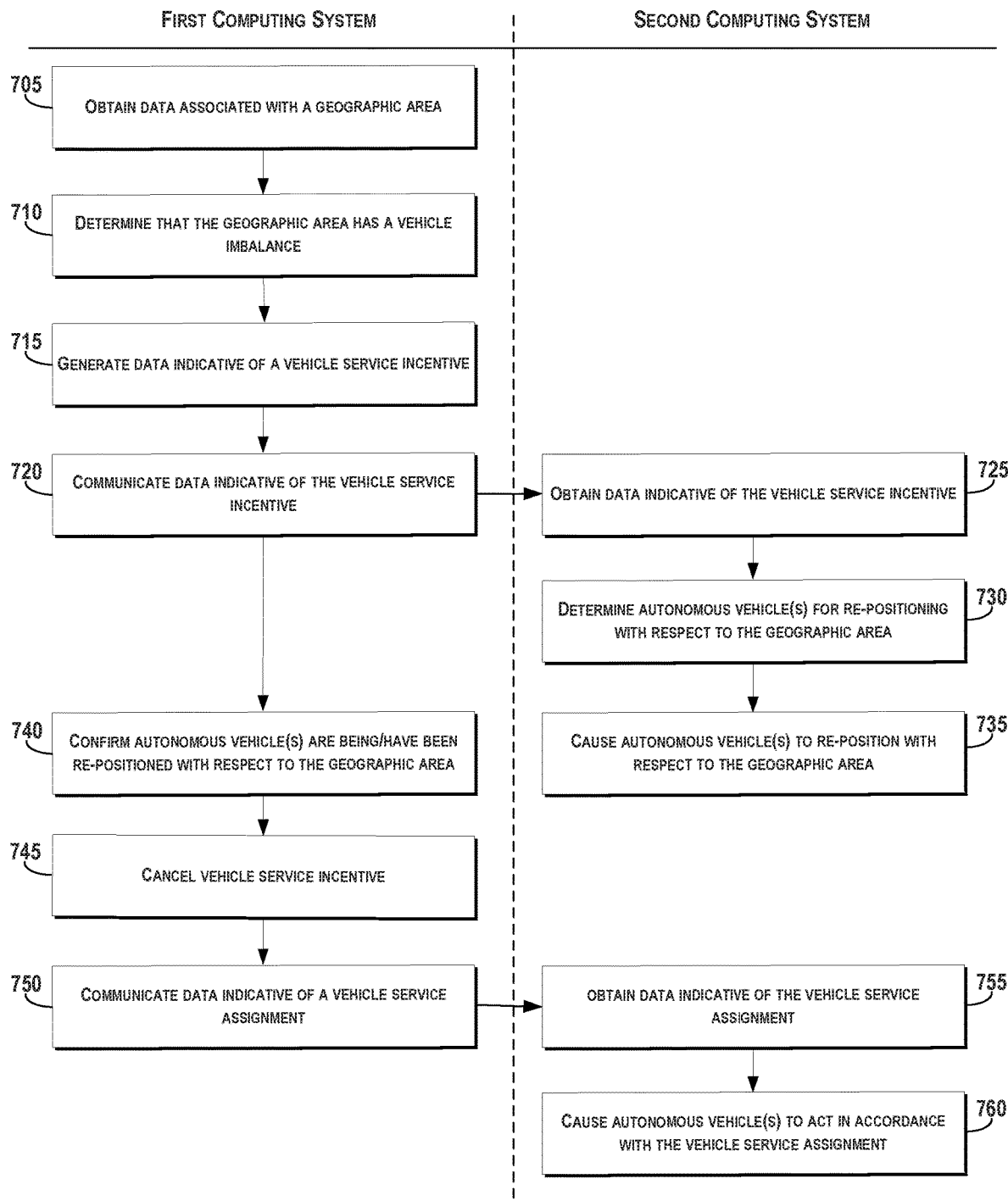
FIG. 7 depicts a flow diagram of another example method for controlling autonomous vehicles according to example embodiments of the present disclosure.

FIG. 7 depicts a flow diagram of another example method for controlling/re-positioning autonomous vehicles according to example embodiments of the present disclosure. One or more portion(s) of the method 700 can be implemented by a computing system that includes one or more computing devices such as, for example, the computing systems described with reference to the other figures (e.g., the operations computing system 225A-B, 300, a vehicle provider computing system 210, 350, vehicle computing system 100, 340, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-3 and/or 8), for example, to control/re-position one or more autonomous vehicles. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One or more portions of method 700 can be performed additionally, or alternatively, by other systems.

At (705), the method 700 can include obtaining data associated with a geographic area. For instance, a first computing system can obtain data associated with a geographic area. The first computing system can be a computing system of a service entity such as, for example, an operations computing system associated with a service entity (e.g., operations computing system 300). The geographic area can be one in which the service entity offers vehicle services to one or more users. The data associated with the geographic area can include, for example, at least one of data indicative of a demand for the one or more vehicle services associated with the geographic area, data indicative of a number of vehicles within the geographic area, data indicative of an event associated with the geographic area, and/or data indicative of a weather condition associated with the geographic area.

At (710), the method 700 can include determining that the geographic area has a vehicle imbalance. For instance, the first computing system (e.g., an operations computing system 300) can determine that the geographic area has a vehicle imbalance based at least in part on the data associated with the geographic area. For example, the first computing system can determine that the demand for vehicle services within the geographic area is greater than the supply of vehicles (e.g., non-autonomous and/or autonomous vehicles) within the geographic area.

At (715), the method 700 can include generating data indicative of a vehicle service incentive. For instance, the first computing system (e.g., an operations computing system 300) can generate data indicative of a vehicle service incentive associated with the geographic area that has the vehicle imbalance. As described herein, a vehicle service incentive can be an enticement to a vehicle provider to re-position one or more of its associated autonomous vehicles with respect to the geographic area. For example, the vehicle service incentive can include an increase in a compensation parameter associated with the vehicle service. Additionally, or alternatively, the vehicle service incentive can include an increase in a rating parameter (e.g., associated with a first autonomous vehicle or the vehicle provider that undertakes a vehicle service assignment associated with the vehicle service incentive).

At (720), the method 700 can include communicating data indicative of the vehicle service incentive. For instance, the first computing system (e.g., an operations computing system 300) can communicate the data indicative of the vehicle service incentive to a second computing system. The second computing system can be associated with a vehicle provider (e.g., a vehicle provider computing system 350). As described herein, a vehicle provider can be associated with one or more autonomous vehicles. In some implementations, the first computing system can communicate the data indicative of the vehicle service incentive to a vehicle computing system of an autonomous vehicle. At (725), the second computing system (e.g., a vehicle provider computing system 350, a vehicle computing system 100) can obtain the data indicative of the vehicle service incentive. Additionally, or alternatively, a vehicle computing system of an autonomous vehicle can obtain the data indicative of the vehicle service incentive.

At (730), the method 700 can include determining one or more autonomous vehicles for re-positioning with respect to the geographic area. The second computing system associated with the vehicle provider (e.g., a vehicle provider computing system 350, etc.) can be configured to select at least one of the one or more autonomous vehicles for re-positioning with respect to the geographic area. By way of example, the second computing system can select one or more autonomous vehicles of a vehicle provider's fleet to be re-positioned with respect to the geographic area (e.g., to travel to or to travel away from the geographic area, etc.). The selected autonomous vehicles can be vehicles that are online with the service entity associated with the vehicle service incentive. The selected autonomous vehicles can be vehicles that are in an idle state. In some implementations (e.g., in the event the data indicative of the vehicle service incentive is communicated to the autonomous vehicle), the vehicle computing system can determine that the autonomous vehicle is to be re-positioned with respect to the geographic data.

At (735), the method 700 can include causing the one or more autonomous vehicles to re-position with respect to the geographic area. For instance, the second computing system can cause the one or more autonomous vehicles to be re-positioned with respect to the geographic area. This can include, for example, the second computing system communicating data to the autonomous vehicle(s) indicating that the autonomous vehicles are to travel to (or away from) the geographic area. The vehicle computing system of the autonomous vehicle can initiate a motion control in accordance with the re-positioning of the autonomous vehicle (e.g., in response to the data from the vehicle provider computing system, in response to the determination that the vehicle is to be re-positioned, etc.). For instance, the vehicle controller can send one or more signals to the vehicle control systems to cause the autonomous vehicle to begin to travel toward (or away from) the imbalanced geographic area.

At (740), the method 700 can include confirming that the one or more autonomous vehicles are being or have been re-positioned with respect to the geographic area. For instance, the first computing system (e.g., an operations computing system 300) can confirm that a first autonomous vehicle of the one or more autonomous vehicles associated with the vehicle provider is being or has been re-positioned with respect to the geographic area. This confirmation can be performed in variety of ways. For example, the first computing system can obtain data indicative of a motion plan of the first autonomous vehicle. The first computing system can determine that the first autonomous vehicle is being or has been re-positioned with respect to the geographic area based at least in part on the data indicative of the motion plan of the first autonomous vehicle. Additionally, or alternatively, the first computing system can obtain location data associated with the first autonomous vehicle. The first computing system can determine that the first autonomous vehicle is being or has been re-positioned with respect to the geographic area based at least in part on the data indicative of the location data.

In some implementations, at (745), the method 700 can include cancelling the vehicle service incentive. For instance, the first computing system can cancel the vehicle service incentive such that it is no longer available to one or more vehicle providers. For example, a first vehicle provider can re-position a first autonomous vehicle with respect to the geographic area. The first computing system can indicate that the vehicle service incentive associated with the geographic area is unavailable to the vehicle providers other than the first vehicle provider (e.g., the vehicle providers that did not re-position vehicles with respect to the geographic area), as described herein. In some implementations, the vehicle service incentive can remain available to the vehicle providers that at least began to re-position autonomous vehicle(s) with respect to the geographic area that has the vehicle imbalance (e.g., the first vehicle provider).

At (750), the method 700 can include communicating data indicative of a vehicle service assignment. The first computing system (e.g., an operations computing system 300) can communicate data indicative of a vehicle service assignment associated with the geographic area to an autonomous vehicle that is being or has been re-positioned with respect to the geographic area with the vehicle imbalance (e.g., re-positioned to or away from the geographic area). For example, the first computing system can obtain data indicative of a vehicle service request for a vehicle service associated with the geographic area. The first computing system can generate data indicative of a vehicle service assignment based at least in part on the vehicle service incentive and the vehicle service request. The first computing system can communicate the data indicative of the vehicle service assignment to at least one of the second computing system associated with the vehicle provider or the first autonomous vehicle (e.g., an autonomous vehicle that is being or has been re-positioned).

At (755), the method 700 can include obtaining data indicative of a vehicle service assignment. For instance, the second computing system can obtain data indicative of the vehicle service assignment. In some implementations, the vehicle provider computing system can obtain the data indicative of the vehicle service assignment and communicate it to an autonomous vehicle. In some implementations, the vehicle computing system of the autonomous vehicle can obtain the data indicative of the vehicle service assignment from the first computing system (e.g., an operations computing system 300).

At (760), the method 700 can include causing the autonomous vehicle to act in accordance with the vehicle service assignment. For instance, the second computing system can cause an autonomous vehicle to act in accordance with the vehicle service assignment. For example, the second computing system can provide data to the vehicle computing system indicating that the autonomous vehicle is to travel to pick-up a user for a transportation service. The vehicle computing system can initiate a motion control in accordance with the vehicle service assignment (e.g., send one or more signals to control the motion of the autonomous vehicle to travel to retrieve the user).

Figure 8:
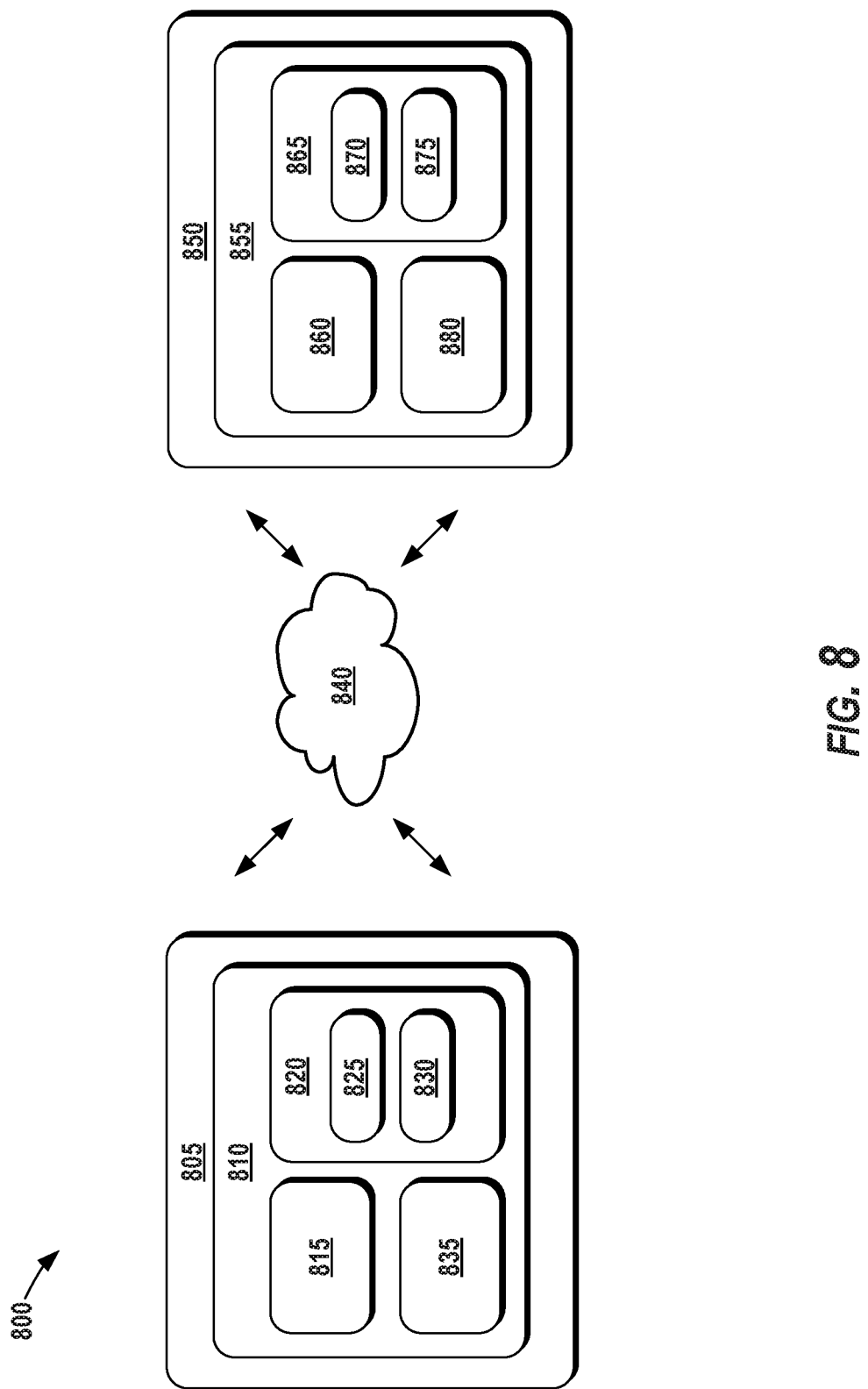
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing systems 100, 340 described herein. The example system 800 can include a remote computing system 850 (e.g., that is remote from the vehicle computing system). The remote computing system 850 can represent/correspond to any of the operations computing systems (e.g., 225A-B, 300) described herein and/or the vehicle provider computing systems 210, 350 described herein. The vehicle computing system 805 and the remote computing system 850 can be communicatively coupled to one another over one or more network(s) 840.

The computing device(s) 810 of the vehicle computing system 805 can include processor(s) 815 and a memory 820.

The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) on-board the vehicle can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (the vehicle computing system 805) to perform operations such as any of the operations and functions of the vehicle computing system 100 (or for which it is configured), one or more of the operations and functions of the vehicle provider computing system 210, 350 (or for which it is configured), one or more of the operations and functions of the operations computing systems described herein (or for which it is configured), one or more of the operations and functions for controlling/re-positioning a vehicle, one or more of the operations and functions for determining that the vehicle should be re-positioned, one or more portions of the methods 600 and/or 700, and/or one or more of the other operations and functions of the computing systems described herein.

The memory 820 can store data 830 that can be obtained (e.g., acquired, received, retrieved, accessed, created, stored, etc.). The data 830 can include, for instance, sensor data, map data, vehicle state data, perception data, prediction data, motion planning data, data associated with a vehicle client, data associated with a service entity's telecommunications network, data associated with an API, data associated with a library, data associated with library parameters, data associated with vehicle service incentives, data associated with re-positioning assignments, data associated with vehicle service assignments, data associated with acceptances and/or rejections of re-positioning assignments and/or vehicle service assignments, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) on-board a vehicle and/or a remote computing device that is remote from the vehicle (e.g., of the system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s)

855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the operations computing systems 225A-B, 300 described herein, any operations and functions of the vehicle provider computing systems 210, 300, any of the operations and functions for which the operations computing systems and/or the vehicle computing systems are configured, one or more of the operations and functions of the vehicle computing system 100 described herein, one or more of the operations and functions for controlling a vehicle, one or more of the operations and functions for determining a vehicle for re-positioning, one or more portions of the methods 600 and/or 700, and/or one or more of the other operations and functions described herein.

The memory 865 can store data 875 that can be obtained. The data 875 can include, for instance, data associated with service requests, communications associated with/provided by vehicles, data to be communicated to vehicles, application programming interface data, data associated with vehicles, data associated with geographic areas, data indicative of vehicle imbalances, data associated with re-positioning assignments, data associated with vehicle service incentives, data associated with vehicle service assignments, data associated with acceptances and/or rejections of re-positioning assignments and/or vehicle service assignments, data associated with different service entities, data associated with fleet(s) of vehicles, and/or other data/information such as, for example, that described herein. In some implementations, the computing device(s) 855 can obtain data from one or more memories that are remote from the system 850 and/or are onboard a vehicle.

The computing device(s) 855 can also include a communication interface 880 used to communicate with one or more system(s) onboard a vehicle and/or another computing device that is remote from the system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

Computing tasks, operations, and functions discussed herein as being performed at a vehicle (e.g., via the vehicle computing system) can instead be performed by computing device(s) that are remote from the vehicle (e.g., via a vehicle provider computing system, an operations computing system, etc.), and/or vice versa. Moreover, operations, and functions discussed herein as being performed at a service entity (e.g., via an operations computing system) can instead be performed by other computing device(s) such as those of the vehicle provider computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling autonomous vehicles, comprising:
   obtaining, by a first computing system comprising one or more computing devices, data associated with a geographic area;
   determining, by the first computing system, that the geographic area has a vehicle imbalance based at least in part on the data associated with the geographic area;
   generating, by the first computing system, data indicative of a vehicle service incentive associated with the geographic area that has the vehicle imbalance;
   communicating, by the first computing system, the data indicative of the vehicle service incentive to a second computing system associated with a vehicle provider, wherein the vehicle provider is associated with one or more autonomous vehicles; and confirming, by the first computing system, that a first autonomous vehicle of the one or more autonomous vehicles associated with the vehicle provider is being or has been re-positioned with respect to the geographic area.

2. The computer-implemented method of claim 1, wherein confirming that the first autonomous vehicle of the one or more autonomous vehicles associated with the vehicle provider is being or has been re-positioned with respect to the geographic area comprises:

obtaining data indicative of a motion plan of the first autonomous vehicle; and determining that the first autonomous vehicle is being or has been re-positioned with respect to the geographic area based at least in part on the data indicative of the motion plan of the first autonomous vehicle.

3. The computer-implemented method of claim 1, wherein confirming that the first autonomous vehicle of the one or more autonomous vehicles associated with the vehicle provider is being or has been re-positioned with respect to the geographic area comprises:

obtaining location data associated with the first autonomous vehicle; and determining that the first autonomous vehicle is being or has been re-positioned with respect to the geographic area based at least in part on the data indicative of the location data.

4. The computer-implemented method of claim 1, further comprising:

obtaining, by the first computing system, data indicative of a vehicle service request for a vehicle service associated with the geographic area;

generating, by the first computing system, data indicative of a vehicle service assignment based at least in part on the vehicle service incentive and the vehicle service request; and communicating, by the first computing system, the data indicative of the vehicle service assignment to at least one of the second computing system associated with the vehicle provider or the first autonomous vehicle.

5. The computer-implemented method of claim 4, wherein the vehicle service incentive comprises an increase in a compensation parameter associated with the vehicle service.

6. The computer-implemented method of claim 4, wherein the vehicle service incentive comprises an increase in a rating parameter associated with the first autonomous vehicle or the vehicle provider.

7. The computer-implemented method of claim 1, wherein the data associated with the geographic area comprises at least one of data indicative of a demand for the one or more vehicle services associated with the geographic area, data indicative of a number of vehicles within the geographic area, data indicative of an event associated with the geographic area, or data indicative of a weather condition associated with the geographic area.

8. The computer-implemented method of claim 1, wherein the second computing system associated with the vehicle provider is configured to select at least one of the one or more autonomous vehicles for re-positioning with respect to the geographic area.

9. A computing system comprising:

one or more processors; and one or more tangible, non-transitory, computer readable media that store instructions that when executed by the one or more processors cause the computing system to perform operations comprising:

obtaining data indicative of a geographic area with a vehicle imbalance;

generating data indicative of a vehicle service incentive associated with the geographic area that has the vehicle imbalance;

communicating the data indicative of the vehicle service incentive to a plurality of other computing systems of a plurality of vehicle providers, each different computing system being associated with a different vehicle provider, and each different vehicle provider being associated with one or more different autonomous vehicles; and confirming that a first autonomous vehicle associated with a first vehicle provider is being or has been re-positioned with respect to the geographic area.

10. The computing system of claim 9, wherein the operations further comprise:

indicating that the vehicle service incentive associated with the geographic area is unavailable to the vehicle providers other than the first vehicle provider.

11. The computing system of claim 10, wherein indicating that the vehicle service associated with the geographic area is unavailable to the vehicle providers other than the first vehicle provider comprises:

communicating, to the other computing systems associated with the other vehicle providers, data indicating that the vehicle service incentive associated with the geographic area is unavailable.

12. The computing system of claim 9, wherein the operations comprise:

determining a number of autonomous vehicles needed for re-positioning with respect to the geographic area based at least in part on the vehicle imbalance.

13. The computing system of claim 12, wherein the operations comprise:

confirming that a plurality of autonomous vehicles with at least the number of autonomous vehicles needed for re-positioning with respect to the geographic area are being or have been re-positioned with respect to the geographic area.

14. The computing system of claim 13, wherein a first autonomous vehicle of the plurality of autonomous vehicles is associated with a first vehicle provider and wherein a second autonomous vehicle of the plurality of autonomous vehicles is associated with a second vehicle provider.

15. One or more tangible, non-transitory, computer-readable media that store instructions that, when executed by one or more processors, cause the one or more processors to perform operations, the operations comprising:

obtaining data indicative of a geographic area with a vehicle imbalance;

generating data indicative of a vehicle service incentive associated with the geographic area that has the vehicle imbalance;

communicating, to a plurality of computing systems, the data indicative of the vehicle service incentive associated with the geographic area, wherein each computing system of the plurality of computing systems is associated with a different vehicle provider;

confirming that a first autonomous vehicle associated with a first vehicle provider is being or has been re-positioned with respect to the geographic area; and communicating data indicative of a first vehicle service assignment to the first autonomous vehicle, wherein the first vehicle service assignment is based at least in part on the vehicle service incentive, and wherein the first vehicle service assignment is indicative of a first requested vehicle service.

16. The one or more tangible, non-transitory, computer-readable media of claim 15, wherein the operations further comprise:
confirming that a second autonomous vehicle associated with a second vehicle provider is being or has been re-positioned with respect to the geographic area, wherein the second vehicle provider is different from the first vehicle provider; and
communicating data indicative of a second vehicle service assignment to the second autonomous vehicle, wherein the second vehicle service assignment is based at least in part on the vehicle service incentive, and wherein the second vehicle service assignment is indicative of a second requested vehicle service.

17. The one or more tangible, non-transitory, computer-readable media of claim 15, wherein the vehicle service incentive comprises an increase in a compensation parameter associated with the first requested vehicle service.

18. The one or more tangible, non-transitory, computer-readable media of claim 15, wherein the vehicle service incentive is associated with a pre-determined time period.

19. The computer-implemented method of claim 1, further comprising:
generating, by the first computing system, data indicative of a vehicle service assignment based at least in part on the vehicle service incentive; and
initiating a motion control of the first autonomous vehicle in accordance with the vehicle service request.

20. The computer-implemented method of claim 1, further comprising:
cancelling, by the first computing system, the vehicle service incentive after the confirmation that the first autonomous vehicle associated with the first vehicle provider is being or has been re-positioned with respect to the geographic area.

* * * * *

UNITED STATES PATENT AND TRADEMARK OFFICE
CERTIFICATE OF CORRECTION

| | |
|---|---|
| PATENT NO. | : 11,501,643 B2 |
| APPLICATION NO. | : 16/401629 |
| DATED | : November 15, 2022 |
| INVENTOR(S) | : Goldman et al. |

It is certified that error appears in the above-identified patent and that said Letters Patent is hereby corrected as shown below:

On the Title Page

In item (72), in "Inventors", in Column 1, Line 1, delete "Fransico," and insert --Francisco,-- therefor Signed and Sealed this
Tenth Day of January, 2023

*Katherine Kelly Vidal*
*Director of the United States Patent and Trademark Office*